(12) United States Patent
Yamamoto

(10) Patent No.: US 7,542,213 B2
(45) Date of Patent: Jun. 2, 2009

(54) PROJECTING ZOOM LENS AND PROJECTION DISPLAY DEVICE

(75) Inventor: Chikara Yamamoto, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/860,997

(22) Filed: Sep. 25, 2007

(65) Prior Publication Data

US 2008/0074756 A1 Mar. 27, 2008

(30) Foreign Application Priority Data

Sep. 26, 2006 (JP) ............................ P2006-261209

(51) Int. Cl.
G02B 15/14 (2006.01)
(52) U.S. Cl. ................. 359/676; 359/686; 359/689; 359/691
(58) Field of Classification Search ................ 359/676, 359/686, 689, 691
See application file for complete search history.

(56) References Cited

U.S. PATENT DOCUMENTS

2003/0030917 A1* 2/2003 Omura ...................... 359/691
2005/0200967 A1 9/2005 Yamasaki et al.
2007/0070513 A1* 3/2007 Yamashita et al. .......... 359/676
2007/0109663 A1* 5/2007 Sano et al. ................. 359/686

FOREIGN PATENT DOCUMENTS

| JP | 2001-311872 A | 11/2001 |
| JP | 2005-156963 A | 6/2005 |
| JP | 2005-266103 A | 9/2005 |

\* cited by examiner

Primary Examiner—Ricky L Mack
Assistant Examiner—James R Greece
(74) Attorney, Agent, or Firm—Birch, Stewart, Kolasch & Birch, LLP

(57) ABSTRACT

A power varying operation is performed by moving four lens groups out of six lens groups. A reduction side of a zoom lens is constructed as a substantially telecentric system. An aspheric lens is arranged in a pupil neighboring position where an effective aperture becomes smallest. Conditional Expressions (1) to (5) are satisfied.

$$1.2 \leq bf/fw \qquad (1)$$

$$|fa/fw| \leq 4.5 \qquad (2)$$

$$\phi a/\phi im \leq 1.0 \qquad (3)$$

$$|ffaw/fw| \leq 1.5 \qquad (4)$$

$$E \leq 300 \times 10^{-7}(/°\text{C.}) \qquad (5)$$

12 Claims, 21 Drawing Sheets

EXAMPLE 1

EXAMPLE 2

FIG. 10 EXAMPLE 10

FIG. 16
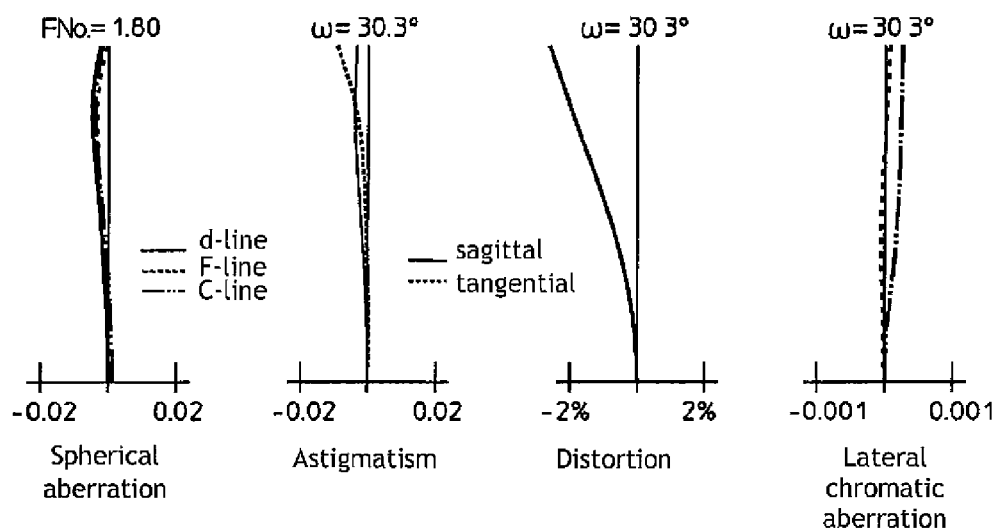
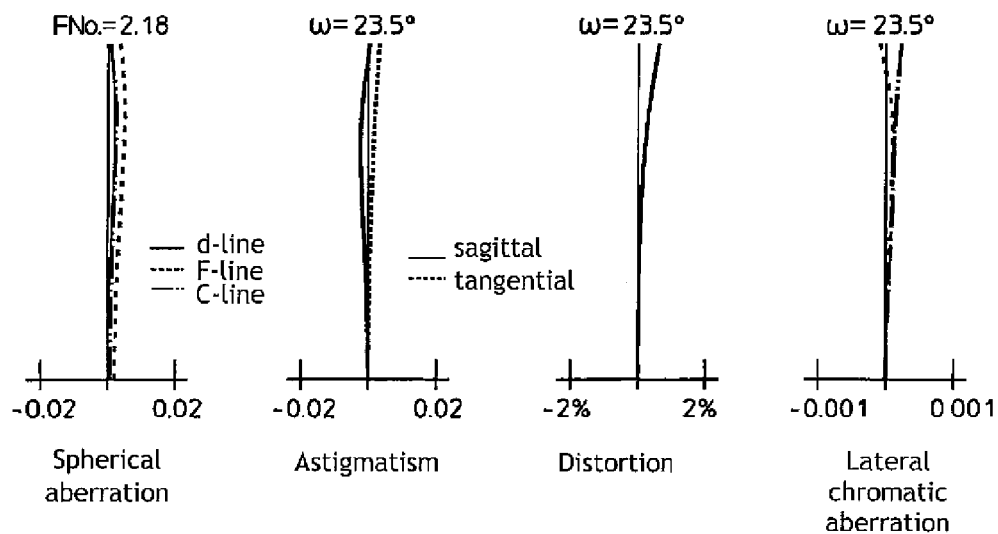

FIG. 19
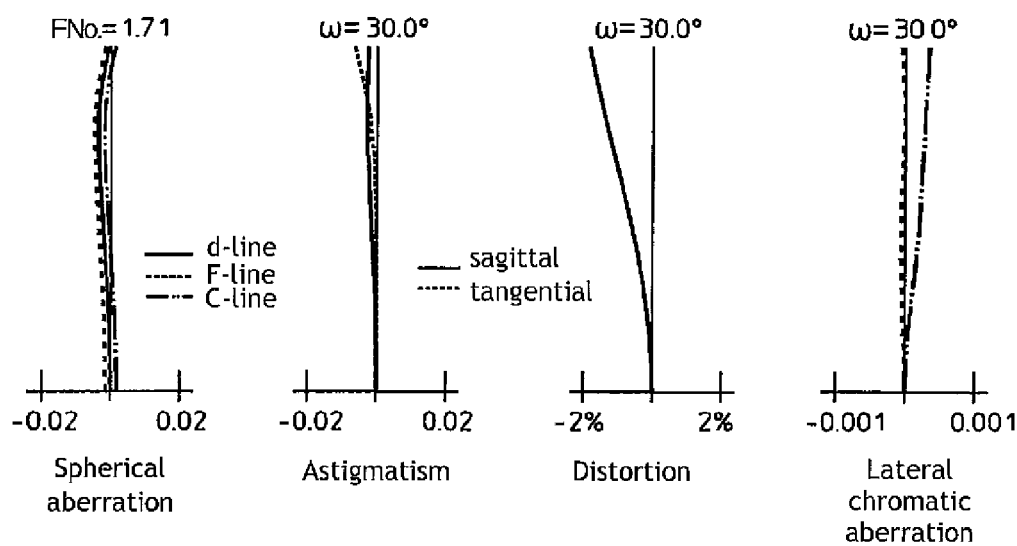
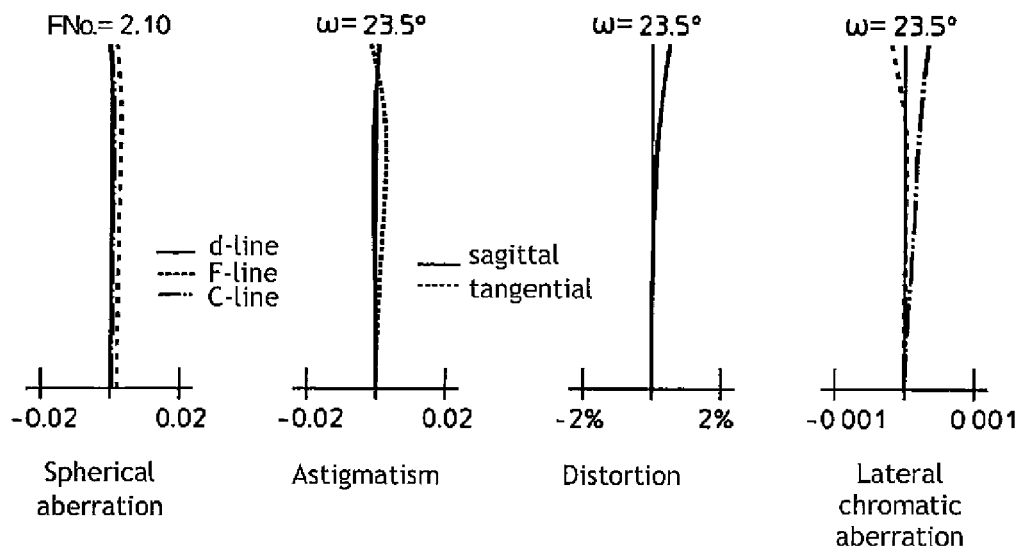

PROJECTING ZOOM LENS AND PROJECTION DISPLAY DEVICE

CROSS-REFERENCE TO RELATED APPLICATIONS

This application is based upon and claims the benefit of priority from the Japanese Patent Application No. 2006-261209 filed on Sep. 26, 2006, the entire contents of which are incorporated herein by reference.

BACKGROUND OF THE INVENTION

1. Technical Field

The invention relates to a projecting zoom lens installed into a projection display device and the projection display device and, more particularly, relates to a projecting zoom lens for use in a projector system into which a light valve such as a transmission type liquid crystal, a reflection type liquid crystal or DMD (Digital Micromirror Device) is installed and a projection display device.

2. Description of the Related Art

Nowadays the demand for a projection type projector is rising rapidly with the spread of personal computers.

Known as a light valve used in such a projection type projector to optically modulate illumination light based on a video signal, are a transmission or reflection liquid crystal display device, a DMD device in which micromirrors are aligned regularly, and the like.

In order to make the color synthesis of luminous fluxes from the respective light valves or in order to separate the illumination light and the projection light in the reflection type light valve such as DMD, a long back focus is required in the optical system using a plurality of light valves. Furthermore, the following demands are rising.

1. Demand for a high-resolution zoom lens in response to an improvement of a high definition of the light valve,
2. Demand for a zoom lens having a large zoom ratio owing to an extension of the installable area of the projection display device,
3. Demand for a so-called lens shift projecting function of shifting a projection image largely with respect to the projection display device, and
4. Demand for an increase in wide angle, which makes it possible for a viewer to watch a large image at a projection position close to the projection display device In the case where a higher definition of the projecting zoom lens, a larger zoom ratio, and a wider angle obtained by increasing a diameter of an image circle on the reduction side are achieved in response to the demands 1 to 4, all measures to solve these problems lead to an increase in size of the lens and cause inevitably an increase in cost. Therefore, the aspheric lens is used as a means for achieving such high-performance lens not to cause an increase in size of the lens.

As a zoom lens in which the aspheric lens is used to avoid an increase in size of the lens, known are zoom lenses disclosed in JP 2001-311872 A (corresponding to U.S. Pat. No. 6,587,279), JP 2005-156963 A and JP 2005-266103 A (corresponding to US 2005/0200967 A).

In this case, normally the reduction side of the zoom lens used in the projection display device is constructed as the telecentric system, which constitutes a configurative difference from a zoom lens in an imaging lens.

However, when it is attempted to reduce a size of the lens in which the reduction side is constructed as the telecentric system by any one of technologies disclosed in the above listed publications, a curvature of an S image surface occurs and it is difficult to attain a high definition. A main cause of the curvature of the S image surface depends largely on a negative power of the lens located near a pupil. In the above listed publications, the curvature of the S image surface is corrected insufficiently.

Also, in JP 2001-311872 A (corresponding to U.S. Pat. No. 6,587,279) and JP 2005-156963 A propose a small zoom ratio type of compact zoom lens. However, the back focus of the lens is short and the angle of view is narrow.

Further, JP 2005-266103 A (corresponding to US 2005/0200967 A) proposes a compact zoom lens whose zoom ratio is large and whose angle of view is wide. However, a plastics material is supposed as a material of the aspheric lens in this zoom lens. This plastics material is effective for a cost reduction but is weak at a temperature change. In JP 2005-266103 A (corresponding to US 2005/0200967 A), plastics aspheric lenses are classified into lenses having a positive power and a negative power, respectively, and power ratios among those lenses are specified. However, actually a temperature distribution in the zoom lens is not always kept constant, so that an absolute value of the power itself assigned to a single body of the plastics aspheric lens must be suppressed small. As a result, in the proposed embodiment, the power assigned to a single body itself of the plastics aspheric lens is suppressed small, and therefore an effect of the aspheric lens is also reduced. Also, a temperature rise is easily caused near the pupil in the zoom lens by the influence of reduction in a diameter of a luminous flux, and such condition is unsuitable for the use of the plastics aspheric lens.

SUMMARY OF THE INVENTION

The invention has been made in light of the above circumstances, and provides a projecting zoom lens and a projection display device, which are capable of achieving a long back focus, a large zoom ratio, a wide angle of view while its size is still kept compact, and also correcting satisfactorily various aberrations, particularly a field curvature of an S image surface, while taking account of the influence of a temperature change.

According to an aspect of the invention, a projecting zoom lens includes a plurality of lens group. At least two lens groups out of the plurality of lens groups are moved to perform a power varying operation. A reduction side of the zoom lens is constructed as a substantially telecentric system. At least one lens out of lenses of the plurality of lens groups is formed of an aspheric lens having at least one aspheric surface. The following Conditional Expressions (1) to (5) are satisfied:

$$1.2 \leq bf/fw \tag{1}$$

$$|fa/fw| \leq 4.5 \tag{2}$$

$$\phi a/\phi im \leq 1.0 \tag{3}$$

$$|ffaw/fw| \leq 1.5 \tag{4}$$

$$E \leq 300 \times 10^{-7} \, (/^\circ \text{C.}) \tag{5}$$

here bf denotes an overall system back focus on the reduction side in air, fw denotes an overall system focal length at a wide angle end, fa denotes a focal length of the aspheric lens whose effective aperture is smallest, φa denotes a maximum effective aperture of the aspheric lens whose effective aperture is smallest, φim denotes a maximum diameter of an image circle in a conjugate position on the reduction side, ffaw denotes a distance, on an optical axis, between (i) a surface on a magnification side of a surface of the aspheric lens whose effective aperture is smallest and (ii) a focal position, on the magnification side, of a complex lens that consists of the aspheric lens whose effective aperture is smallest and all lenses located on the reduction side of the aspheric lens whose effective aperture is smallest, at the wide angle end, and E denotes a coefficient of a linear expansion of the aspheric lens whose effective aperture is smallest.

Also, the aspheric lens whose effective aperture is smallest may be a lens having a negative refractive power.

Also, the following Conditional Expression (6A) may be satisfied:

$$2.0 < L/fw < 5.0 \tag{6A}$$

where L denotes a total lens length of the overall system at the wide angle end.

Also, the following Conditional Expressions (6B) and (7) may be satisfied:

$$2.0 < L/fw < 4.0 \tag{6B}$$

$$55 \leq 2\omega \text{ (degree)} \tag{7}$$

where 2ω denotes an angle of view at the wide angle end.

Also, the following Conditional Expressions (6C) and (8) may be satisfied:

$$3.0 < L/fw < 7.5 \tag{6C}$$

$$1.5 \leq ft/fw \tag{8}$$

where L denotes a total lens length of the overall system at the wide angle end, and ft denotes an overall system focal length at a telephoto end.

Also, at least one of (i) an air lens formed by a surface, on the reduction side, of the aspheric lens whose effective aperture is smallest and a surface adjacent to the surface on the reduction side, and (ii) an air lens formed by a surface, on the magnification side, of the aspheric lens whose effective aperture is smallest and a surface adjacent to the surface on the magnification side, may constitute a negative air lens. The negative air lens may satisfy the following Conditional Expression (9):

$$-2.0 < fn/fw \tag{9}$$

where fn denotes a focal length of the negative air lens.

Also, the aspheric lens whose effective aperture is smallest may satisfy the following Conditional Expression (10):

$$vda \leq 50 \tag{10}$$

where vda denotes an Abbe number of the aspheric lens whose effective aperture is smallest.

Also, in the plurality of lens groups, an Fn lens group that has a fixed negative refractive power during power variation may be arranged on the outermost magnification side and an Fp lens group that has a fixed positive refractive power during the power variation may be arranged on the outermost reduction side. Three or more lens groups that are moved during the power variation may be arranged between the Fn lens group and the Fp lens group.

Also, according to another aspect of the invention, a projection display device includes a light source, one or plural light valves, an illumination optical system and any of the projecting zoom lenses set forth above. The one or plural light valves is illuminated with a luminous flux from the light source. The illumination optical system guides illumination light from the light source to the respective light valves. The projecting zoom lens projects the illumination light modulated by the light valves, onto a screen.

With the projecting zoom lens and the projection display device set forth above, the aspheric lens whose reduction side is constructed as a substantial telecentric system and whose effective aperture is smallest is arranged in a position in which the luminous flux is limited to some extent (normally a position close to a pupil position). Meanwhile, in order to achieve predetermined effects and advantages with such a configuration or to establish such a configuration, Conditional Expressions (1) to (5) are satisfied.

When Conditional Expressions (1) to (5) are satisfied, the following advantages can be achieved. More particularly, when Conditional Expression (1) is satisfied, an enough back focus can be obtained. When Conditional Expression (2) is satisfied, a size increase of the lens and an increase of the number of lenses can be suppressed. When Conditional Expression (3) is satisfied, a size of the aspheric lens whose effective aperture is smallest can be reduced. When Conditional Expression (4) is satisfied, the field curvature of the S (sagittal) image surface can be corrected satisfactorily. When Conditional Expression (5) is satisfied, the influence of a temperature change on the aspheric lens whose effective aperture is smallest can be suppressed.

In more detailed explanation, when Conditional Expression (4) is satisfied, the aspheric lens whose effective aperture is smallest is arranged in a position that is close to a pupil position. Also, when Conditional Expression (5) is satisfied, there is no need to suppress a power of the aspheric lens whose effective aperture is smallest small, and thus it is possible to bring out the performance as the aspheric lens.

As a result, the long back focus, the large zoom ratio and the wide angle of view can be accomplished while a size of the lens is still kept compact. Also, various aberrations, particularly the field curvature of the S image surface, can be corrected satisfactorily while taking account of the influence of a temperature change.

BRIEF DESCRIPTION OF THE DRAWINGS

FIG. 16 is aberration charts of the projecting zoom lens according to Example 6.

FIG. 19 is aberration charts of the projecting zoom lens according to Example 9.

DETAILED DESCRIPTION OF EMBODIMENTS OF THE INVENTION

Figure 1:
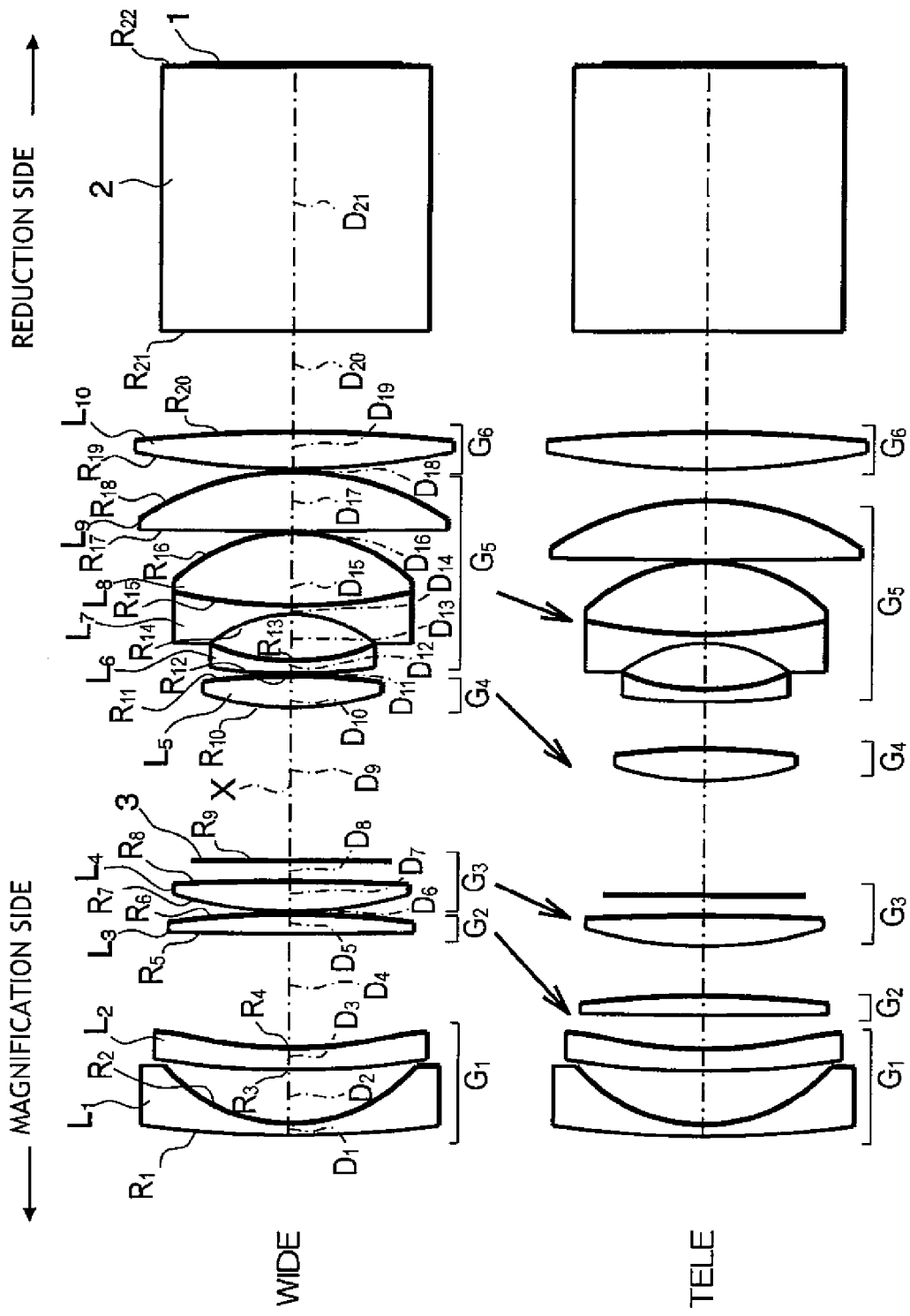
FIG. 1 is a lens configurative view of a projecting zoom lens according to Example 1 of the invention at a wide angle end and a telephoto end.

An embodiment of the invention will be explained with reference to the drawings hereinafter. FIG. 1 shows the basic configuration of a projecting zoom lens of Example 1 according to the invention, and shows a lens configurative view at a wide angel end (WIDE) and a telephoto end (TELE). As a typical example of this embodiment, a projecting zoom lens according to Example 1 will be explained hereunder.

More particularly, this projecting zoom lens employs a six-group configuration (it is noted that a five-group configuration is employed in Examples 6 to 9 described later). A first lens group $G_1$ to a sixth lens group $G_6$ are arranged in order from the magnification side. Also, upon varying a power from the wide angle end to the telephoto end, the first lens group $G_1$ and the sixth lens group $G_6$ are fixed and the second lens group $G_2$ to the fifth lens group $G_5$ are moved toward the magnification side. Also, a mask (diaphragm) 3 is provided between the second lens group $G_2$ and the third lens group $G_3$ (it is noted that the mask 3 is not provided in Examples 6, 10 described later).

A glass block 2 corresponding to an infrared cutting filter, a low-pass filter, and a color synthesis optical system (illumination light separating optical system) is arranged between the third lens group $G_3$ and a display plane 1 of the DMD, the liquid crystal display device, or the like. Also, the symbol "X" in FIG. 1 denotes an optical axis.

In this case, the first lens group $G_1$ includes a first lens $L_1$ formed of a negative lens and a second lens $L_2$ formed of a negative lens. Also, the second lens group $G_2$ includes a third lens $L_3$ formed of a positive lens. The third lens group $G_3$ includes a fourth lens $L_4$ formed of a positive lens. The fourth lens group $G_4$ includes a fifth lens $L_5$ formed of a positive lens.

Also, the fifth lens group $G_5$ includes a sixth lens $L_6$ formed of a negative lens, a seventh lens $L_7$ formed of a negative lens, an eighth lens $L_8$ formed of a positive lens, and a ninth lens $L_9$ formed of a positive lens. Also, the sixth lens group $G_6$ includes a tenth lens $L_{10}$ formed of a positive lens.

In this case, an aspheric lens (sixth lens $L_6$) whose effective aperture is smallest is arranged so that the luminous flux is incident thereon in a state where a diameter of the luminous flux is decreased through a lens system.

Also, respective spherical surfaces in this embodiment are represented by following aspheric formula.

$$Z = \frac{Y^2/R}{1+\sqrt{1-K\times Y^2/R^2}} + \sum_{i=3}^{14} A_i Y^i$$

where Z: a length of perpendicular from a point on an aspheric surface at a distance Y from the optical axis to a tangent plane (a plane perpendicular to the optical axis) of an aspheric vertex Y: distance from the optical axis R: radius of curvature of the aspheric surface near the optical axis K: eccentricity $A_i$: aspheric coefficient (i=3 to 14)

Also, in this embodiment, the following Conditional Expressions (1), (2), (3), (4), (5), (7), (9), (10) are satisfied. Also, the following Conditional Expressions (6A), (6B) are satisfied in Examples 1 and 6 to 9 described later, and the following Conditional Expression (8) is satisfied in Examples 2 to 5 and 10 described later. It is noted that Conditional Expression (6A) is also satisfied in Examples 5.

| | |
|---|---|
| $1.2 \leq bf/fw$ | (1) |
| $\|fa/fw\| \leq 4.5$ | (2) |
| $\phi a/\phi im \leq 1.0$ | (3) |
| $\|ffaw/fw\| \leq 1.5$ | (4) |
| $E \leq 300\times10^{-7}$ (/° C.) | (5) |
| $2.0 < L/fw < 5.0$ | (6A) |
| $2.0 < L/fw < 4.0$ | (6B) |
| $3.0 < L/fw < 7.5$ | (6C) |
| $55 \leq 2\omega$ (degree) | (7) |
| $1.5 \leq ft/fw$ | (8) |
| $-2.0 < fn/fw$ | (9) |
| $vda \leq 50$ | (10) | where bf: overall system back focus on the reduction side in air fw: overall system focal length at a wide angle end fa: focal length of the aspheric lens whose effective aperture is smallest φa: maximum effective aperture of the aspheric lens whose effective aperture is smallest φim: maximum diameter of an image circle in a conjugate position on the reduction side ffaw: a distance, on an optical axis, between (i) a surface on a magnification side of a surface of the aspheric lens whose effective aperture is smallest and (ii) a focal position, on the magnification side, of a complex lens that consists of the aspheric lens whose effective aperture is smallest and all lenses located on the reduction side of the aspheric lens whose effective aperture is smallest, at the wide angle end E: coefficient of a linear expansion of the aspheric lens whose effective aperture is smallest L: total lens length of the overall system 2ω: angle of view at the wide angle end ft: overall system focal length at a telephoto end fn: focal length of the negative air lens vda: Abbe number of the aspheric lens whose effective aperture is smallest Next, the technical meanings of foregoing Conditional Expressions (1) to (5), (6A), (6B), (6C), (7) to (10) will be described below.

Conditional Expression (1) specifies a condition to achieve an enough back focus. IF bf/fw falls below the lower limit, the back focus is not enough. Thus, the color synthesis optical system or the illumination light separating optical system cannot be inserted.

Conditional Expression (2) specifies a condition to achieve a size reduction of the lens system. If |fa/fw| exceeds the upper limit, an increase in size of the lens, an increase in the number of lenses, and an increase in cost are brought about.

Conditional Expression (3) specifies a condition to achieve a size reduction of the aspheric lens whose effective aperture is smallest. If φa/φim exceeds the upper limit, an increase in size of the aspheric lens and an increase in cost are brought about.

Conditional Expression (4) specifies a condition to correct aberration satisfactorily. If |ffaw/fw| exceeds the upper limit, the field curvature of the S image surface becomes excessively large and it is difficult to correct this curvature satisfactorily.

Conditional Expression (5) specifies a coefficient of linear expansion of the aspheric lens whose effective aperture is smallest, and means that a material such as plastics is excluded. If E exceeds the upper limit, this aspheric lens is susceptible to the influence of a temperature change, which results in a deterioration of various aberrations. A coefficient of linear expansion of BK7 as the common optical glass is about $70 \times 10^{-7}$ whereas a coefficient of linear expansion of the plastics used as the optical material is about $600 \times 10^{-7}$. Generally speaking, it is difficult for the plastics material to satisfy Conditional Expression (5).

Conditional Expression (6A) specifies a condition to correct aberration satisfactorily and achieve a size reduction of the lens system, in the zoom lens having a relatively low magnification. If L/fw exceeds the upper limit, a size of the lens system is increased. Also, if L/fw falls below the lower limit, the field curvature of the S image surface becomes excessively large and it is difficult to correct this curvature satisfactorily.

Conditional Expression (6B) narrows down the upper limit of Conditional Expression (6A), and can enhance further the effect achieved by Conditional Expression (6A).

Conditional Expression (6C) specifies a condition to correct aberration satisfactorily and achieve a size reduction of the lens system, in the zoom lens having a relatively high magnification. If L/fw exceeds the upper limit, a size of the lens system is increased. Also, if L/fw falls below the lower limit, the field curvature of the S image surface is increased excessively and it is difficult to correct this curvature satisfactorily.

Conditional Expression (7) specifies the angle of view at the wide angle end. If 2ω falls below the lower limit, an installing area of the projection display device is restricted, and it is difficult to project the enlarged image from a short distance.

Conditional Expression (8) specifies a zoom ratio. If ft/fw falls below the lower limit, an installing area of the projection display device is restricted.

Conditional Expression (9) specifies a condition to achieve a size reduction of the lens system. If fn/fw falls below the lower limit, it is difficult to avoid a size increase of the lens system, while maintaining the good aberration correction.

Conditional Expression (10) specifies a condition to correct the chromatic aberration satisfactorily. If vda exceeds the upper limit, it is difficult to correct the chromatic aberration.

Figure 21:
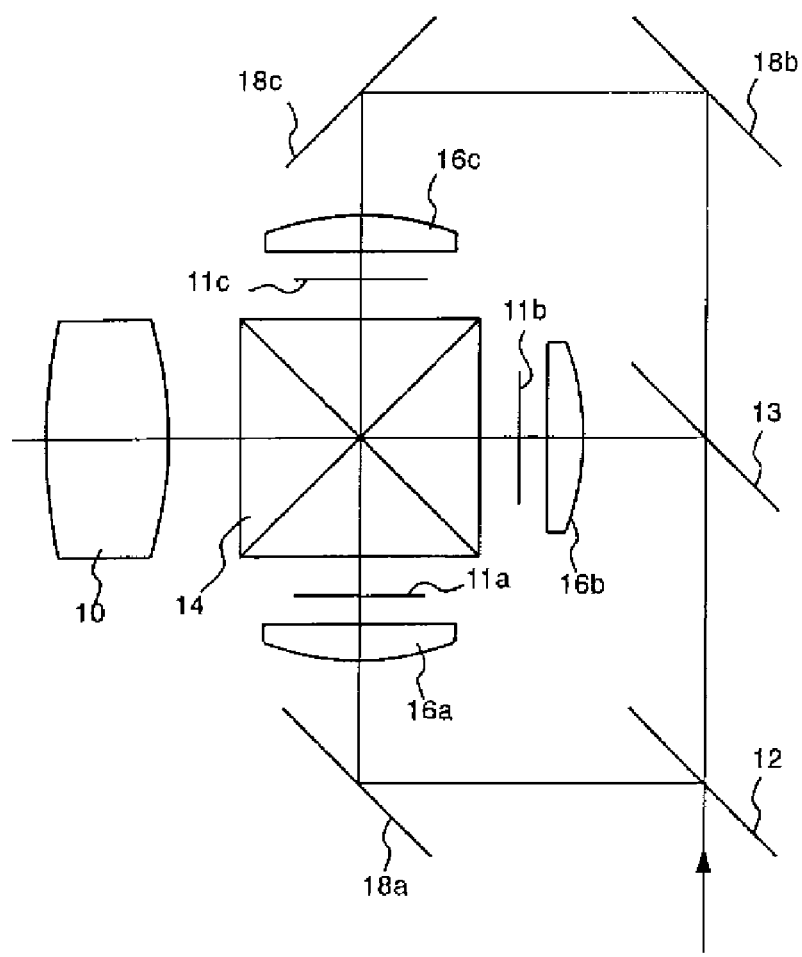
FIG. 21 is a schematic configurative view of a projection display device using the projecting zoom lens according to an embodiment.

Next, an example of a projection display device into which the above projecting lens is incorporated will be described with reference to FIG. 21 hereunder. The projection display device shown in FIG. 21 includes transmission liquid crystal panels 11a to 11c as light valves, and uses the above projecting zoom lens according to this embodiment as a projecting zoom lens 10. Also, although not shown between a light source 20 and a dichroic mirror 12 in the figure, white light from the light source 20 is incident on the liquid crystal panels 11a to 11c corresponding to three-color luminous fluxes (G light, B light, R light) respectively via an illumination optical system, then modulated optically, then color-synthesized by a cross dichroic prism 14, and then projected onto a screen (not shown) through a projecting zoom lens 10. This device includes dichroic mirrors 12, 13 for color separation, the cross dichroic prism 14 for color synthesis, condenser lenses 16a to 16c, and total reflection mirrors 18a to 18c. Since the projection display device of this embodiment uses the projecting zoom lens according to this embodiment, the projection display device that can provide a good picture quality of the projected image at a wide angle and take an account the influence of a temperature change in use can be obtained.

Here, the projecting zoom lens of the invention is not limited to be used as a projecting zoom lens in the projection display device that uses the transmission liquid crystal display panels. This projecting zoom lens may be used as a projecting lens of a device that uses a reflection liquid crystal display panel or another optical modulating means such as DMD.

EXAMPLES

Respective examples will be described below concretely based on those data.

Example 1

As described above, the projecting zoom lens according to Example 1 was constructed as shown in FIG. 1. That is, in this projecting zoom lens, the first lens group $G_1$ included a first lens $L_1$ formed of a negative meniscus lens having a convex surface directed to the magnification side, and a second lens $L_2$ formed of a negative meniscus lens having a convex surface directed to the magnification side. Also, the second lens group $G_2$ included a third lens $L_3$ formed of a biconvex lens. The third lens group $G_3$ included a fourth lens $L_4$ formed of a biconvex lens. The fourth lens group $G_4$ included a fifth lens $L_5$ formed of a biconvex lens. Also, the fifth lens group $G_5$ included a sixth lens $L_6$ formed of a plano-concave lens having a flat surface, near the optical axis, directed to the magnification side, a cemented lens constructed by a seventh lens $L_7$ formed of a biconcave lens and an eighth lens $L_8$ formed of a biconvex lens, and a ninth lens $L_9$ formed of a biconvex lens. Also, the sixth lens group $G_6$ included a tenth lens $L_{10}$ formed of a biconvex lens. Also, a mask 3 was arranged on the reduction side of the fourth lens $L_4$, and was contained in the third lens group $G_3$. In this Example, an "aspheric lens whose effective aperture is smallest" was the sixth lens $L_6$. A pupil position was near the magnification side of a surface of the fifth lens $L_5$ on the magnification side.

In this Example 1, radii of curvature R of respective lens surfaces (normalized under the assumption that a focal length at the wide angle end of the overall lens system is set to 1; the same rule applies to the following Tables), center thicknesses of respective lenses, air distances D between the respective lens (normalized similarly to the radius R of curvature; the same rule applies to the following Tables), refractive indexes Nd of the respective lenses with respect to d-line and Abbe numbers νd of the respective lenses are given on the upper part of Table 1. In this Table 1 and Tables 3, 5, 7, 9, 11, 13, 15, 17 and 19 described later, numerical values corresponding to the respective symbols R, D, Nd, and νd are given to increase in order from the magnification side.

Also, a distance between the first lens group $G_1$ and the second lens group $G_2$ (variable distance 4), a distance between the second lens group $G_2$ and the third lens group $G_3$ (variable distance 6), a distance between the third lens group $G_3$ and the fourth lens group $G_4$ (variable distance 9), a distance between the fourth lens group $G_4$ and the fifth lens group $G_5$ (variable distance 11), and a distance between the fifth lens group $G_5$ and the sixth lens group $G_6$ (variable distance 18) at the focal length 1.0 (wide angle end) and the focal length 1.2 (telephoto end) are given on the lower part of Table 1.

Also, the third surface, the fourth surface and the twelfth surface, the fourteenth surface were formed of the aspheric surfaces. In Table 2, values of the respective constants K, $A_3$, $A_4$, $A_5$, $A_6$, $A_7$, $A_8$, $A_9$, $A_{10}$, $A_{11}$, $A_{12}$ as to these aspheric surfaces in the above aspheric formula are given.

TABLE 1

| Surface number | R | D | Nd | νd |
|---|---|---|---|---|
| 1 | 5.9990 | 0.0624 | 1.62041 | 60.3 |
| 2 | 0.9043 | 0.2863 | | |
| 3* | 19.6555 | 0.1140 | 1.51007 | 56.2 |
| 4* | 2.8618 | 0.5925(variable) | | |
| 5 | 44.2508 | 0.1020 | 1.83400 | 37.2 |
| 6 | −5.3355 | 0.0163(variable) | | |
| 7 | 2.2209 | 0.1617 | 1.83400 | 37.2 |
| 8 | −13.5546 | 0.1085 | | |
| 9 | ∞ | 0.8172(variable) (mask) | | |
| 10 | 1.5654 | 0.1709 | 1.48749 | 70.2 |
| 11 | −3.4049 | 0.0163(variable) | | |
| 12* | ∞ | 0.0651 | 1.68458 | 31.1 |
| 13* | 1.8261 | 0.2465 | | |
| 14 | −0.7168 | 0.0461 | 1.84666 | 23.8 |
| 15 | 2.8530 | 0.3875 | 1.49700 | 81.6 |
| 16 | −0.9324 | 0.0109 | | |
| 17 | 56.3030 | 0.3142 | 1.80100 | 35.0 |
| 18 | −1.4913 | 0.0163(variable) | | |
| 19 | 4.0896 | 0.1970 | 1.79952 | 42.2 |
| 20 | −7.4908 | 0.5372 | | |
| 21 | ∞ | 1.4109 | 1.51633 | 64.1 |
| 22 | ∞ | | | |

| Variable separation | | |
|---|---|---|
| Focal distance | 1.0(wide end) | 1.2(telephoto end) |
| $D_4$ | 0.5925 | 0.1637 |
| $D_6$ | 0.0163 | 0.2642 |
| $D_9$ | 0.8172 | 0.6113 |
| $D_{11}$ | 0.0163 | 0.2529 |
| $D_{18}$ | 0.0163 | 0.1664 |

*Aspheric surface

TABLE 2

Aspheric surface coefficient

| surface | K | $A_3$ | $A_4$ | $A_5$ | $A_6$ | $A_7$ |
|---|---|---|---|---|---|---|
| 3 | 1.0000 | $5.6616 \times 10^{-2}$ | $3.2669 \times 10^{-1}$ | $-6.7798 \times 10^{-1}$ | $8.3947 \times 10^{-1}$ | $4.3344 \times 10^{-1}$ |
| 4 | 1.0000 | $1.4255 \times 10^{-1}$ | $-3.3629 \times 10^{-1}$ | $8.4327 \times 10^{-1}$ | $-6.5992 \times 10^{-1}$ | $-4.4818 \times 10^{-1}$ |
| 12 | 1.0000 | 0.0000 | 1.6971 | 0.0000 | $-1.0461 \times 10$ | 0.0000 |
| 13 | 1.0000 | 0.0000 | 1.8856 | 0.0000 | $-1.0669 \times 10$ | 0.0000 |

| | $A_8$ | $A_9$ | $A_{10}$ | $A_{11}$ | $A_{12}$ |
|---|---|---|---|---|---|
| 3 | −1.4825 | −1.4743 | 2.2586 | 0.0000 | 0.0000 |
| 4 | $-1.2257 \times 10^{-3}$ | $-5.9949 \times 10^{-1}$ | $9.7137 \times 10^{-1}$ | 0.0000 | 0.0000 |
| 12 | $4.7201 \times 10$ | 0.0000 | $-1.2447 \times 10^2$ | 0.0000 | $1.4257 \times 10^2$ |
| 13 | $5.0897 \times 10$ | 0.0000 | $-1.5069 \times 10^2$ | 0.0000 | $2.0234 \times 10^2$ |

Also, numerical values corresponding to Conditional Expressions in Example 1 are given in Table 21.

Figure 11:
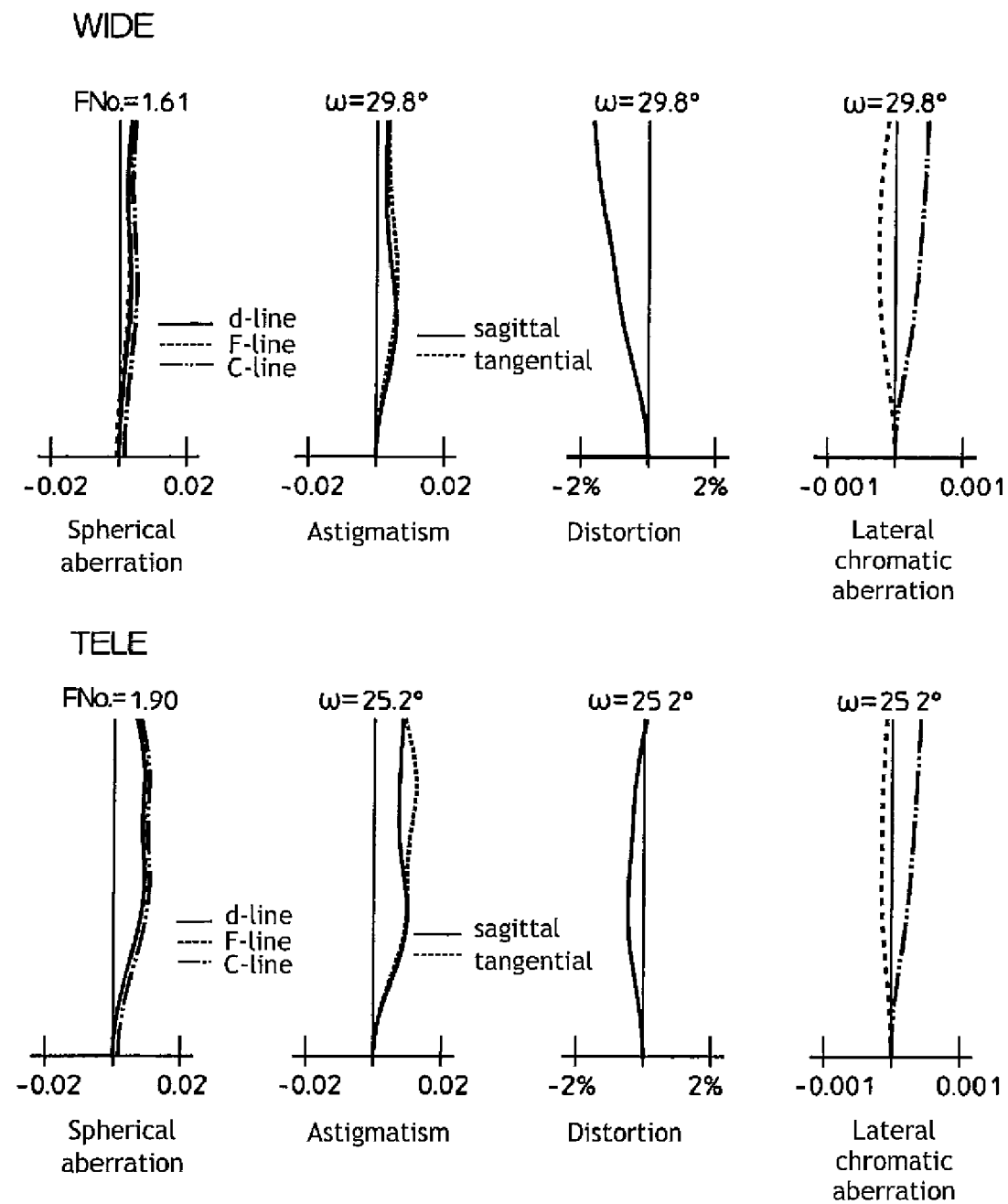
FIG. 11 is aberration charts of the projecting zoom lens according to Example 1.

FIG. 11 is aberration charts showing various aberrations (spherical aberration, astigmatism, distortion, and lateral chromatic aberration) of the projecting zoom lens according to Example 1. In FIG. 11 and FIGS. 12 to 20, aberrations with respect to a sagittal image surface and a tangential image surface are shown in each astigmatism chart, and also aberrations on the F-line and the C-line with respect to the d-line are shown in each lateral-chromatic-aberration chart.

As apparent from FIG. 11, according to the projecting zoom lens of Example 1, the angle of view 2ω was wide, that is, 59.6 degrees at the wide angle end and the respective aberrations were corrected satisfactorily. In particular, since the sixth lens $L_6$ was formed of the aspheric lens, the field curvature of the S image surface could be very satisfactorily corrected. Also, since a value of the coefficient of linear expansion of the sixth lens $L_6$ was set to $101 \times 10^{-7}$, this sixth lens $L_6$ was hardly influenced by a temperature change. Thus, this lens could be arranged in a position on which a luminous flux is limited.

Also, as shown in Table 21, according to the projecting zoom lens of Example 1, Conditional Expressions (1) to (5), (6A), (6B), (6C), (7), (9) and (10) were satisfied.

Example 2

Figure 2:
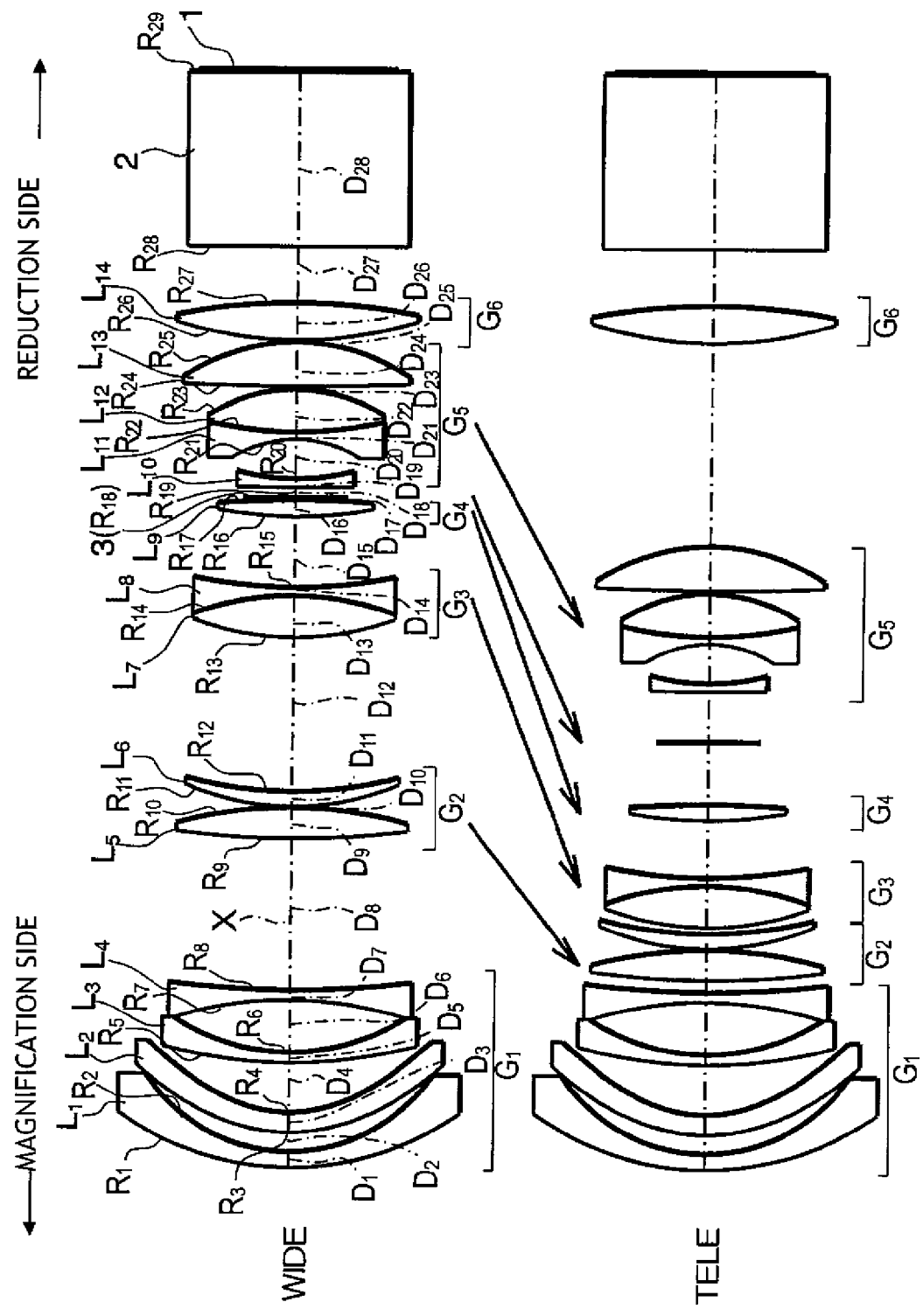
FIG. 2 is a lens configurative view of a projecting zoom lens according to Example 2 of the invention at a wide angle end and a telephoto end.

A schematic configuration of a projecting zoom lens according to Example 2 is shown in FIG. 2. The projecting zoom lens according to Example 2 was constructed substantially similarly to that in Example 1. In description for corresponding drawings, the like reference symbols are affixed to the like elements and thus redundant explanations will be omitted herein.

Example 2 is different from Example 1 mainly in lens configurations of the first lens group $G_1$, the second lens group $G_2$, and the third lens group $G_3$ and in that the mask 3 is provided on the reduction side of the fourth lens group $G_4$ and is moved independently of the respective lens groups.

In the configurations of the first lens group $G_1$, the second lens group $G_2$, and the third lens group $G_3$ of the projecting zoom lens according to Example 2, the first lens group $G_1$ included a first lens $L_1$ formed of a negative meniscus lens having a convex surface directed to the magnification side, a second lens $L_2$ formed of a negative meniscus lens having a convex surface directed to the magnification side, a third lens $L_3$ formed of a negative meniscus lens having a convex surface directed to the magnification side, and a fourth lens $L_4$ formed of a biconcave lens. Also, the second lens group $G_2$ included a fifth lens $L_5$ formed of a biconvex lens and a sixth lens $L_6$ formed of a positive meniscus lens having a convex surface directed to the magnification side. Also, the third lens group $G_3$ included a cemented lens constructed by a seventh lens $L_7$ formed of a biconvex lens and an eighth lens $L_8$ formed of a biconcave lens. In this Example, an "aspheric lens whose effective aperture is smallest" was a tenth lens $L_{10}$, and a pupil position was near the magnification side of a surface of a ninth lens $L_9$ on the magnification side.

In this Example 2, radii of curvature R of the respective lens surfaces, center thicknesses of the respective lenses, air distances D between the respective lens, refractive indexes Nd of the respective lenses with respect to the d-line and Abbe numbers νd of the respective lenses are given on the upper part of Table 3.

Also, a distance between the first lens group $G_1$ and the second lens group $G_2$ (variable distance 8), a distance between the second lens group $G_2$ and the third lens group $G_3$ (variable distance 12), a distance between the third lens group $G_3$ and the fourth lens group $G_4$ (variable distance 15), a distance between the fourth lens group $G_4$ and the mask 3 (variable distance 17), a distance between the mask 3 and the fifth lens group $G_5$ (variable distance 18), and a distance between the fifth lens group $G_5$ and the sixth lens group $G_6$ (variable distance 25) at the focal length 1.0 (wide angle end) and the focal length 2.1 (telephoto end) are given on the lower part of Table 3.

Also, the third surface, the fourth surface and the nineteenth surface, the twentieth surface were formed of the aspheric surfaces, respectively. In Table 4, values of the respective constants K, $A_3$, $A_4$, $A_5$, $A_6$, $A_7$, $A_8$, $A_9$, $A_{10}$, $A_{11}$, $A_{12}$, $A_{13}$, $A_{14}$ as to these aspheric surfaces in the above aspheric formula are given.

TABLE 3

| Surface number | R | D | Nd | ν d |
|---|---|---|---|---|
| 1 | 2.2599 | 0.1199 | 1.67790 | 55.3 |
| 2 | 1.3218 | 0.1442 | | |
| 3* | 1.2747 | 0.1509 | 1.51007 | 56.2 |
| 4* | 0.9848 | 0.3819 | | |
| 5 | 3.7572 | 0.0799 | 1.48749 | 70.2 |
| 6 | 1.6262 | 0.4006 | | |
| 7 | −2.9850 | 0.0732 | 1.49700 | 81.6 |
| 8 | 7.2486 | 1.1431(variable) | | |
| 9 | 6.7473 | 0.2348 | 1.62041 | 60.3 |
| 10 | −3.3694 | 0.0089 | | |
| 11 | 2.0661 | 0.1136 | 1.83400 | 37.2 |
| 12 | 3.1766 | 1.1810(variable) | | |
| 13 | 2.2476 | 0.3183 | 1.69680 | 55.5 |
| 14 | −2.2476 | 0.0622 | 1.72825 | 28.5 |
| 15 | 3.8549 | 0.5408(variable) | | |
| 16 | 3.2608 | 0.1256 | 1.80518 | 25.4 |
| 17 | −7.9391 | 0.0170(variable) | | |
| 18 | ∞ | 0.0799(variable) (mask) | | |
| 19* | ∞ | 0.0666 | 1.68458 | 31.1 |
| 20* | 1.9996 | 0.3012 | | |
| 21 | −0.9154 | 0.0533 | 1.80610 | 33.3 |
| 22 | 2.9752 | 0.3280 | 1.49700 | 81.6 |
| 23 | −1.2441 | 0.0200 | | |
| 24 | 18.6788 | 0.3396 | 1.74320 | 49.3 |
| 25 | −1.5569 | 0.0178(variable) | | |
| 26 | 3.1159 | 0.2819 | 1.49700 | 81.6 |
| 27 | −4.8637 | 0.4306 | | |
| 28 | ∞ | 1.3317 | 1.51633 | 64.1 |
| 29 | ∞ | | | |

| | Variable separation | |
|---|---|---|
| Focal distance | 1.0(wide end) | 2.1(telephoto end) |
| $D_8$ | 1.1431 | 0.0838 |
| $D_{12}$ | 1.1810 | 0.0487 |
| $D_{15}$ | 0.5408 | 0.4329 |
| $D_{17}$ | 0.0170 | 0.4742 |
| $D_{18}$ | 0.0799 | 0.3867 |
| $D_{25}$ | 0.0178 | 1.5531 |

*Aspheric surface

TABLE 4

Aspheric surface coefficient

| surface | K | $A_3$ | $A_4$ | $A_5$ | $A_6$ | $A_7$ |
|---|---|---|---|---|---|---|
| 3 | 0.9815 | $-7.8988 \times 10^{-2}$ | $-6.3269 \times 10^{-2}$ | $6.1638 \times 10^{-1}$ | −1.3319 | $6.3510 \times 10^{-1}$ |
| 4 | 0.6550 | $-8.6765 \times 10^{-2}$ | $-1.2513 \times 10^{-2}$ | $2.8855 \times 10^{-1}$ | $-5.8367 \times 10^{-1}$ | $-1.9698 \times 10^{-1}$ |
| 19 | 1.0000 | 0.0000 | $4.1249 \times 10^{-1}$ | 0.0000 | −2.4552 | 0.0000 |
| 20 | 1.0000 | 0.0000 | $5.1488 \times 10^{-1}$ | 0.0000 | −2.3025 | 0.0000 |

| $A_8$ | $A_9$ | $A_{10}$ | $A_{11}$ | $A_{12}$ | $A_{13}$ | $A_{14}$ |
|---|---|---|---|---|---|---|

TABLE 4-continued

| Aspheric surface coefficient | | | | | | | |
|---|---|---|---|---|---|---|---|
| 3 | $7.1592 \times 10^{-1}$ | $-5.1813 \times 10^{-1}$ | $-5.0636 \times 10^{-1}$ | $6.4426 \times 10^{-1}$ | $-2.3571 \times 10^{-1}$ | 0.0000 | $1.5141 \times 10^{-2}$ |
| 4 | $3.1469 \times 10^{-1}$ | $9.3095 \times 10^{-1}$ | $-2.8472 \times 10^{-1}$ | $-1.4873$ | 1.0335 | 0.0000 | $-9.0360 \times 10^{-2}$ |
| 19 | 7.0813 | 0.0000 | $-9.1404$ | 0.000 | 0.0000 | 0.0000 | 0.0000 |
| 20 | 6.1663 | 0.0000 | $-7.3119$ | 0.000 | 0.0000 | 0.0000 | 0.0000 |

Also, numerical values corresponding to the above Conditional Expressions in Example 2 are given in Table 21.

Figure 12:
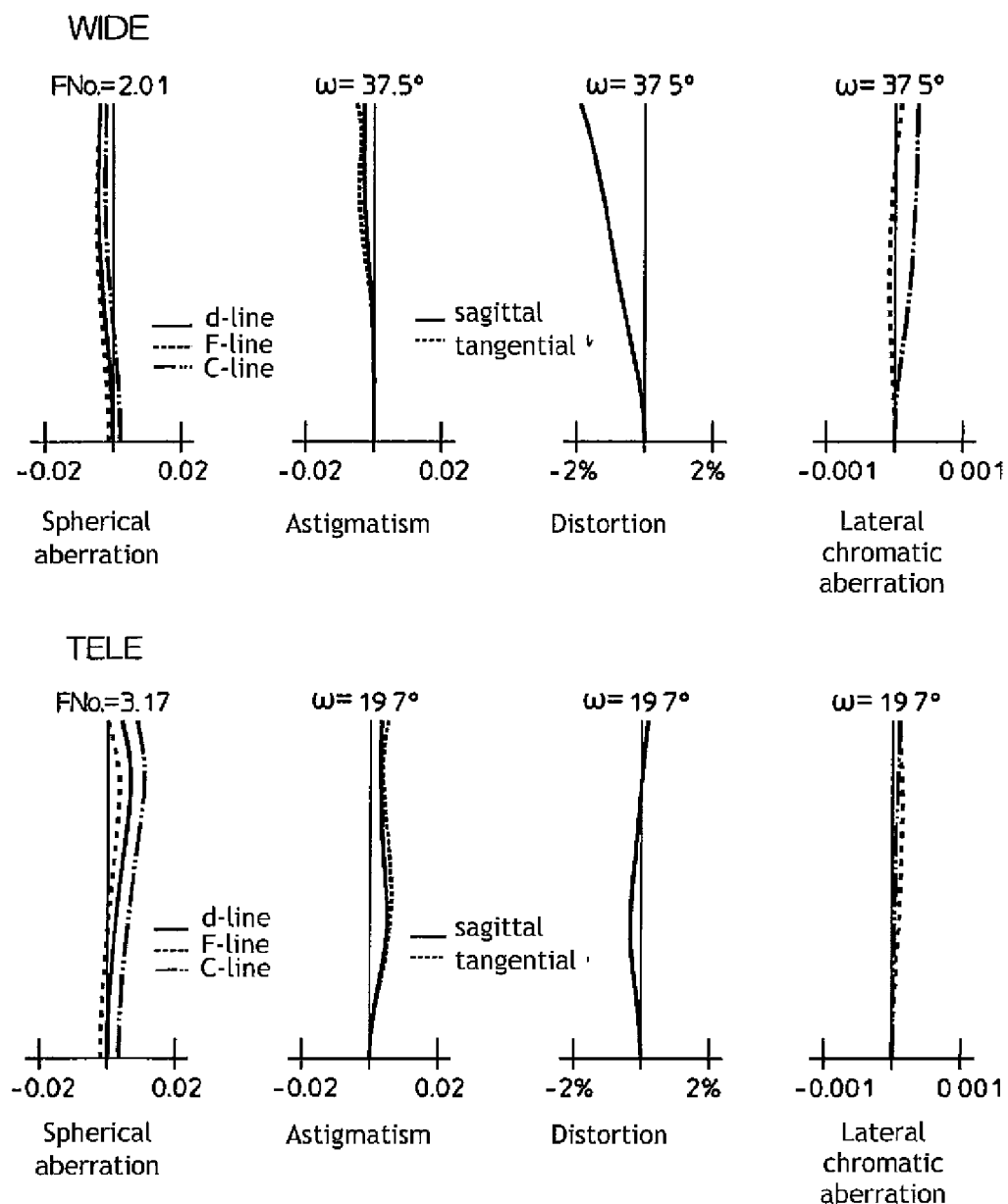
FIG. 12 is aberration charts of the projecting zoom lens according to Example 2.

FIG. 12 is aberration charts showing various aberrations (spherical aberration, astigmatism, distortion, and lateral chromatic aberration) of the projecting zoom lens according to Example 2.

As apparent from FIG. 12, according to the projecting zoom lens in Example 2, the angle of view 2ω was wide, that is, 75.0 degrees at the wide angle end and the respective aberrations were corrected satisfactorily. In particular, since the tenth lens $L_{10}$ was formed of the aspheric lens, the field curvature of the S image surface could be very satisfactorily corrected. Also, since a value of the coefficient of linear expansion of the tenth lens $L_{10}$ was set to $101 \times 10^{-7}$, this tenth lens $L_{10}$ was hardly influenced by a temperature change. Thus, this lens could be arranged in a position on which a luminous flux is limited. Also, in Example 2, a zoom ratio was set to a high magnification of 2.1.

Also, as shown in Table 21, according to the projecting zoom lens in Example 2, Conditional Expressions (1) to (5), (6C), (7) to (10) are satisfied.

Example 3

Figure 3:
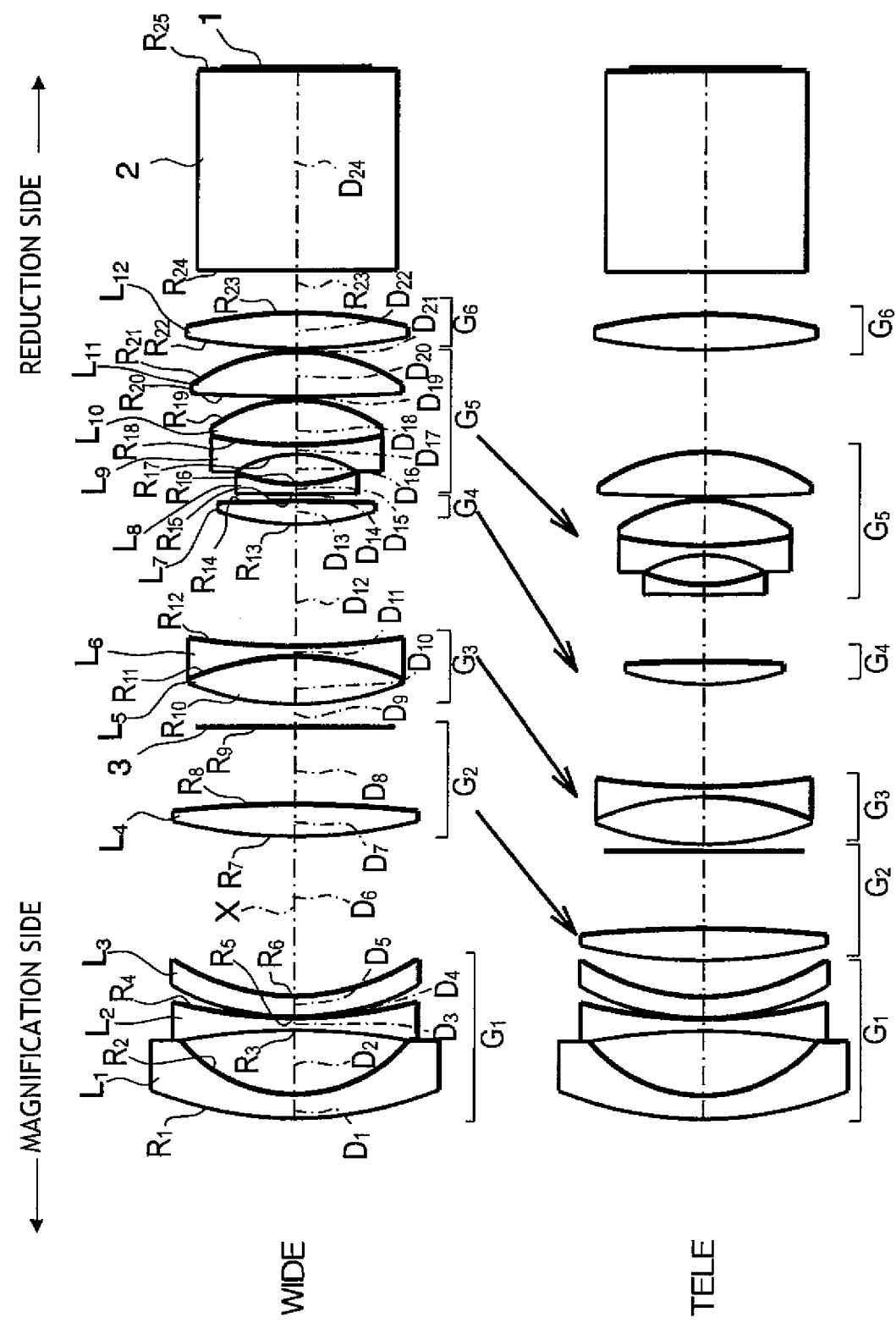
FIG. 3 is a lens configurative view of a projecting zoom lens according to Example 3 of the invention at a wide angle end and a telephoto end.

A schematic configuration of a projecting zoom lens according to Example 3 is shown in FIG. 3. The projecting zoom lens according to Example 3 was constructed substantially similarly to that in Example 1. In explanation of the corresponding drawings, the like reference symbols are affixed to the like elements and thus redundant explanations will be omitted herein.

Example 3 is different from Example 1 mainly in lens configurations of the first lens group $G_1$, the third lens group $G_3$, and the fifth lens group $G_5$ are different and that the mask 3 is provided on the reduction side of the fourth lens $L_4$ and is contained in the second lens group $G_2$.

In the configurations of the first lens group $G_1$, the third lens group $G_3$, and the fifth lens group $G_5$ of the projecting zoom lens according to Example 3, the first lens group $G_1$ included a first lens $L_1$ formed of a negative meniscus lens having a convex surface directed to the magnification side, a second lens $L_2$ formed of a biconcave lens, and a third lens $L_3$ as a negative meniscus lens having a convex surface directed to the magnification side. Also, the third lens group $G_3$ included a cemented lens constructed by a fifth lens $L_5$ formed of a biconvex lens and a sixth lens $L_6$ formed of a biconcave lens. Also, the fifth lens group $G_5$ included an eighth lens $L_8$ formed of a negative meniscus lens having a convex surface directed to the magnification side, a ninth lens $L_9$ formed of a biconcave lens, a tenth lens $L_{10}$ formed of a biconvex lens, and an eleventh lens $L_{11}$ formed of a biconvex lens. In this Example, an "aspheric lens whose effective aperture is smallest" was the eighth lens $L_8$, and a pupil position was near the magnification side of a surface of a seventh lens $L_7$ on the magnification side.

In this Example 3, radii of curvature R of the respective lens surfaces, center thicknesses of the respective lenses, air distances D between the respective lens, refractive indexes Nd of the respective lenses with respect to the d-line and Abbe numbers vd of the respective lenses are given on the upper part of Table 5.

Also, a distance between the first lens group $G_1$ and the second lens group $G_2$ (variable distance 6), a distance between the second lens group $G_2$ (mask 3) and the third lens group $G_3$ (variable distance 9), a distance between the third lens group $G_3$ and the fourth lens group $G_4$ (variable distance 12), a distance between the fourth lens group $G_4$ and the fifth lens group $G_5$ (variable distance 14), and a distance between the fifth lens group $G_5$ and the sixth lens group $G_6$ (variable distance 21) at the focal length 1.0 (wide angle end) and the focal length 1.6 (telephoto end) are given on the lower part of Table 5.

Also, the fifth surface, the sixth surface and the fifteenth surface, the sixteenth surface were formed of the aspheric surfaces, respectively. In Table 6, values of the respective constants K, $A_3$, $A_4$, $A_5$, $A_6$, $A_7$, $A_8$, $A_9$, $A_{10}$, $A_{11}$, $A_{12}$, $A_{13}$, $A_{14}$ as to these aspheric surfaces in the above aspheric formula are given.

TABLE 5

| Surface number | R | D | Nd | vd |
|---|---|---|---|---|
| 1 | 2.9636 | 0.1815 | 1.62041 | 60.3 |
| 2 | 1.1373 | 0.4958 | | |
| 3 | −4.9395 | 0.0934 | 1.51633 | 64.1 |
| 4 | 3.7680 | 0.0104 | | |
| 5* | 2.2411 | 0.1556 | 1.51007 | 56.2 |
| 6* | 1.5649 | 1.2126(variable) | | |
| 7 | 3.9259 | 0.2455 | 1.83400 | 37.2 |
| 8 | −8.9035 | 0.5965 | | |
| 9 | ∞ | 0.1757(variable) (mask) | | |
| 10 | 2.2397 | 0.3642 | 1.79952 | 42.2 |
| 11 | −2.1408 | 0.0783 | 1.75520 | 27.5 |
| 12 | 5.1786 | 0.9443(variable) | | |
| 13 | 1.9797 | 0.1753 | 1.72342 | 38.0 |
| 14 | −12.6930 | 0.0515(variable) | | |
| 15* | 5.8648 | 0.0778 | 1.68893 | 31.1 |
| 16* | 1.0860 | 0.2291 | | |
| 17 | −0.8990 | 0.0714 | 1.80610 | 33.3 |
| 18 | 3.0722 | 0.3494 | 1.51633 | 64.1 |
| 19 | −1.1474 | 0.0276 | | |
| 20 | 13.9812 | 0.3438 | 1.62041 | 60.3 |
| 21 | −1.4624 | 0.0259(variable) | | |
| 22 | 4.2703 | 0.2753 | 1.62041 | 60.3 |
| 23 | −3.5913 | 0.3805 | | |
| 24 | ∞ | 1.5430 | 1.51633 | 64.1 |
| 25 | ∞ | | | |

| | Variable separation | |
|---|---|---|
| Focal distance | 1.0(wide end) | 1.6(telephoto end) |
| $D_6$ | 1.2126 | 0.2690 |
| $D_9$ | 0.1757 | 0.0531 |
| $D_{12}$ | 0.9443 | 0.7900 |
| $D_{14}$ | 0.0515 | 0.5123 |
| $D_{21}$ | 0.0259 | 0.7856 |

*Aspheric surface

TABLE 6

Aspheric surface coefficient

| surface | K | $A_3$ | $A_4$ | $A_5$ | $A_6$ | $A_7$ |
|---|---|---|---|---|---|---|
| 5 | 0.9961 | 0.0000 | $1.0954 \times 10^{-2}$ | 0.0000 | $5.4319 \times 10^{-2}$ | 0.0000 |
| 6 | 0.4199 | 0.0000 | $-4.0237 \times 10^{-2}$ | 0.0000 | $6.1438 \times 10^{-2}$ | 0.0000 |
| 15 | 1.0000 | 0.0000 | $-4.0459 \times 10^{-1}$ | 0.0000 | $5.3221 \times 10^{-1}$ | 0.0000 |
| 16 | 1.0000 | 0.0000 | $-3.0799 \times 10^{-1}$ | 0.0000 | $4.3593 \times 10^{-1}$ | 0.0000 |

| | $A_8$ | $A_9$ | $A_{10}$ | $A_{11}$ | $A_{12}$ | $A_{13}$ | $A_{14}$ |
|---|---|---|---|---|---|---|---|
| 5 | $-2.5318 \times 10^{-2}$ | 0.0000 | $-4.7108 \times 10^{-2}$ | 0.0000 | $4.6723 \times 10^{-2}$ | 0.0000 | $7.7821 \times 10^{-5}$ |
| 6 | $-1.3953 \times 10^{-2}$ | 0.0000 | $-1.4472 \times 10^{-1}$ | 0.0000 | $1.8560 \times 10^{-1}$ | 0.0000 | $-6.1613 \times 10^{-2}$ |
| 15 | $-1.1063$ | 0.0000 | 1.7673 | 0.0000 | 0.0000 | 0.0000 | 0.0000 |
| 16 | $-6.7514 \times 10^{-1}$ | 0.0000 | $5.1328 \times 10^{-1}$ | 0.0000 | 0.0000 | 0.0000 | 0.0000 |

Also, numerical values corresponding to above Conditional Expressions in Example 3 are given in Table 21.

Figure 13:
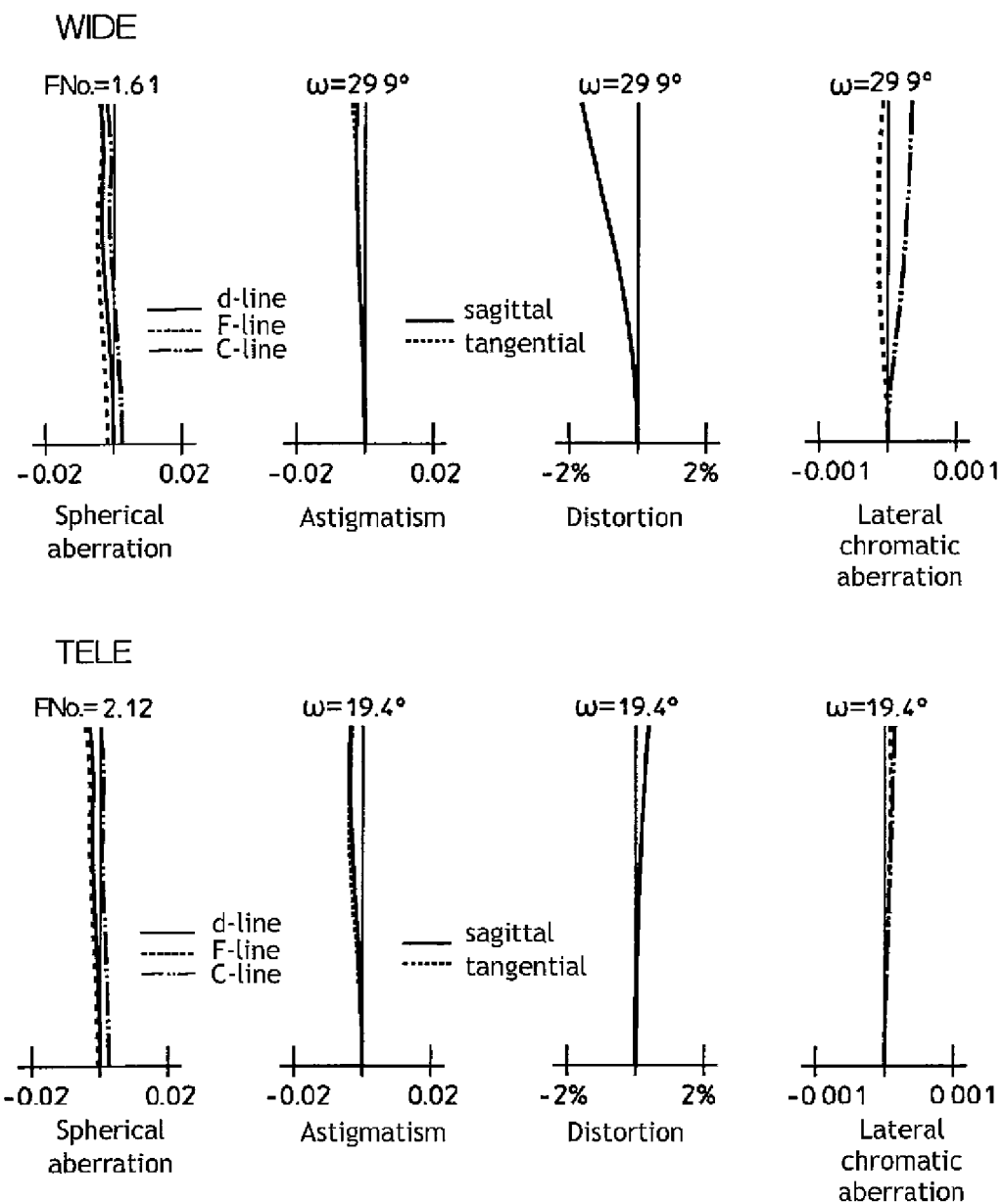
FIG. 13 is aberration charts of the projecting zoom lens according to Example 3.

FIG. 13 is aberration charts showing various aberrations (spherical aberration, astigmatism, distortion, and lateral chromatic aberration) of the projecting zoom lens according to Example 3.

As apparent from FIG. 13, according to the projecting zoom lens in Example 3, the angle of view 2ω was wide, that is, 59.8 degrees at the wide angle end and the respective aberrations were corrected satisfactorily. In particular, since the eighth lens $L_8$ was formed of the aspheric lens, the field curvature of the S image surface could be very satisfactorily corrected. Also, since a value of the coefficient of linear expansion of the eighth lens $L_8$ was set to $101 \times 10^{-7}$, this eighth lens $L_8$ was hardly influenced by a temperature change. Thus, this lens could be arranged in a position on which a luminous flux is limited. Also, in Example 3, a zoom ratio was set to a high magnification of 1.6.

Also, as shown in Table 21, according to the projecting zoom lens in Example 3, Conditional Expressions (1) to (5), (6C), (7) to (10) are satisfied.

Example 4

Figure 4:
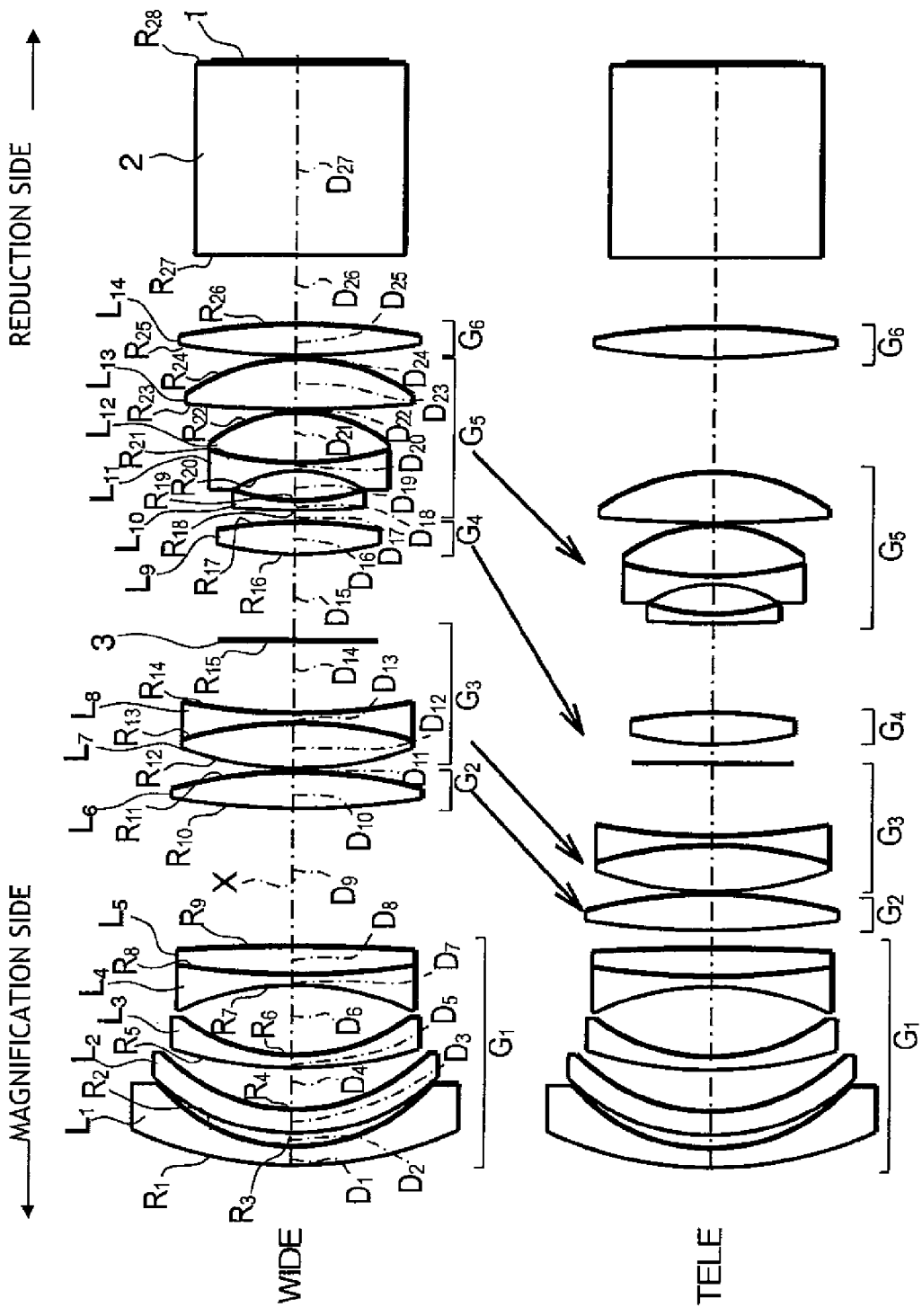
FIG. 4 is a lens configurative view of a projecting zoom lens according to Example 4 of the invention at a wide angle end and a telephoto end.

A schematic configuration of a projecting zoom lens according to Example 4 is shown in FIG. 4. The projecting zoom lens according to Example 4 was constructed substantially similarly to that in Example 1. In explanation of corresponding drawings, the like reference symbols are affixed to the like elements and thus redundant explanations will be omitted herein.

Example 4 is different from Example 1 mainly in the lens configurations of the first lens group $G_1$, the third lens group $G_3$, and the fifth lens group $G_5$.

In the configurations of the first lens group $G_1$, the third lens group $G_3$, and the fifth lens group $G_5$ of the projecting zoom lens according to Example 4, the first lens group $G_1$ included a first lens $L_1$ formed of a negative meniscus lens having a convex surface directed to the magnification side, a second lens $L_2$ formed of a negative meniscus lens having a convex surface directed to the magnification side, a third lens $L_3$ formed of a negative meniscus lens having a convex surface directed to the magnification side, and a cemented lens constructed by a fourth lens $L_4$ formed of a biconcave lens and a fifth lens $L_5$ formed of a biconvex lens. Also, the third lens group $G_3$ included a cemented lens constructed by a seventh lens $L_7$ formed of a biconvex lens and an eighth lens $L_8$ formed of a biconcave lens. Also, the fifth lens group $G_5$ included a tenth lens $L_{10}$ formed of a negative meniscus lens having a convex surface directed to the magnification side, a cemented lens constructed by an eleventh lens $L_{11}$ formed of a biconcave lens and a twelfth lens $L_{12}$ formed of a biconvex lens, and a thirteenth lens $L_{13}$ formed of a biconvex lens. In this Example, an "aspheric lens whose effective aperture is smallest" was the tenth lens $L_{10}$, and a pupil position was near the magnification side of a surface of a ninth lens $L_9$ on the magnification side.

In this Example 4, radii of curvature R of the respective lens surfaces, center thicknesses of the respective lenses, air distances D between the respective lens, refractive indexes Nd of the respective lenses with respect to the d-line and Abbe numbers vd of respective lenses are given on the upper part of Table 7.

Also, a distance between the first lens group $G_1$ and the second lens group $G_2$ (variable distance 9), a distance between the second lens group $G_2$ and the third lens group $G_3$ (variable distance 11), a distance between the third lens group $G_3$ and the fourth lens group $G_4$ (mask 3) (variable distance 15), a distance between the fourth lens group $G_4$ and the fifth lens group $G_5$ (variable distance 17), and a distance between the fifth lens group $G_5$ and the sixth lens group $G_6$ (variable distance 24) at the focal length 1.0 (wide angle end) and the focal length 1.6 (telephoto end) are given on the lower part of Table 7.

Also, the third surface, the fourth surface and the eighteenth surface, the nineteenth surface were formed of the aspheric surfaces, respectively. In Table 8, values of respective constants K, $A_3$, $A_4$, $A_5$, $A_6$, $A_7$, $A_8$, $A_9$, $A_{10}$, $A_{11}$, $A_{12}$, $A_{13}$, $A_{14}$ as to these aspheric surfaces in the above aspheric formula are given.

TABLE 7

| Surface number | R | D | Nd | vd |
|---|---|---|---|---|
| 1 | 3.0008 | 0.1433 | 1.83400 | 37.2 |
| 2 | 1.3916 | 0.1020 | | |
| 3* | 1.8374 | 0.1729 | 1.51007 | 56.2 |
| 4* | 1.4357 | 0.3090 | | |
| 5 | 3.1024 | 0.0988 | 1.48749 | 70.2 |
| 6 | 1.4594 | 0.5276 | | |
| 7 | −2.1116 | 0.0807 | 1.48749 | 70.2 |
| 8 | 5.5680 | 0.2145 | 1.80518 | 25.4 |
| 9 | −15.0614 | 1.0172(variable) | | |
| 10 | 6.2839 | 0.2723 | 1.80610 | 40.9 |
| 11 | −3.6809 | 0.0265(variable) | | |
| 12 | 2.5722 | 0.3436 | 1.83400 | 37.2 |
| 13 | −3.0598 | 0.0742 | 1.84666 | 23.8 |
| 14 | 4.4962 | 0.5435 | | |
| 15 | ∞ | 0.6539(variable) (mask) | | |
| 16 | 2.6077 | 0.2393 | 1.48749 | 70.2 |
| 17 | −3.3127 | 0.0873(variable) | | |
| 18* | 4.9053 | 0.0741 | 1.68893 | 31.1 |

TABLE 7-continued

| | | | | |
|---|---|---|---|---|
| 19* | 1.4695 | 0.2246 | | |
| 20 | −0.9092 | 0.0601 | 1.83400 | 37.2 |
| 21 | 2.5241 | 0.3781 | 1.49700 | 81.5 |
| 22 | −1.1312 | 0.0247 | | |
| 23 | 9.8307 | 0.3779 | 1.62041 | 60.3 |
| 24 | −1.5199 | 0.0245(variable) | | |
| 25 | 4.8386 | 0.2356 | 1.67790 | 55.3 |
| 26 | −4.8386 | 0.5217 | | |
| 27 | ∞ | 1.4428 | 1.51633 | 64.1 |
| 28 | ∞ | | | |

Variable separation

| Focal distance | 1.0(wide end) | 1.6(telephoto end) |
|---|---|---|
| $D_9$ | 1.0172 | 0.1208 |
| $D_{11}$ | 0.0265 | 0.0197 |
| $D_{15}$ | 0.6539 | 0.1467 |
| $D_{17}$ | 0.0873 | 0.6673 |
| $D_{24}$ | 0.0245 | 0.8548 |

*Aspheric surface

TABLE 8

Aspheric surface coefficient

| surface | K | $A_3$ | $A_4$ | $A_5$ | $A_6$ | $A_7$ |
|---|---|---|---|---|---|---|
| 3 | 0.9961 | 0.0000 | $7.2137 \times 10^{-2}$ | 0.0000 | $-4.7281 \times 10^{-2}$ | 0.0000 |
| 4 | 0.4199 | 0.0000 | $7.7474 \times 10^{-2}$ | 0.0000 | $-1.0157 \times 10^{-1}$ | 0.0000 |
| 18 | 1.0000 | 0.0000 | $-8.9268 \times 10^{-2}$ | 0.0000 | $-5.3781 \times 10^{-1}$ | 0.0000 |
| 19 | 1.0000 | 0.0000 | $-8.7830 \times 10^{-3}$ | 0.0000 | $-6.3814 \times 10^{-1}$ | 0.0000 |

| | $A_8$ | $A_9$ | $A_{10}$ | $A_{11}$ | $A_{12}$ | $A_{13}$ | $A_{14}$ |
|---|---|---|---|---|---|---|---|
| 3 | $3.9959 \times 10^{-2}$ | 0.0000 | $3.608 \times 10^{-2}$ | 0.0000 | $-8.0747 \times 10^{-2}$ | 0.0000 | $3.3693 \times 10^{-2}$ |
| 4 | $1.9852 \times 10^{-1}$ | 0.0000 | $-1.795 \times 10^{-1}$ | 0.0000 | $3.2122 \times 10^{-2}$ | 0.0000 | $1.7625 \times 10^{-2}$ |
| 18 | 1.3902 | 0.0000 | −4.6409 | 0.0000 | $3.2354 \times 10$ | 0.0000 | $-6.8532 \times 10$ |
| 19 | 2.4007 | 0.0000 | $-1.218 \times 10$ | 0.0000 | $5.9687 \times 10$ | 0.0000 | $-1.0843 \times 10^2$ |

Also, numerical values corresponding to above Conditional Expressions in Example 4 are given in Table 21.

Figure 14:
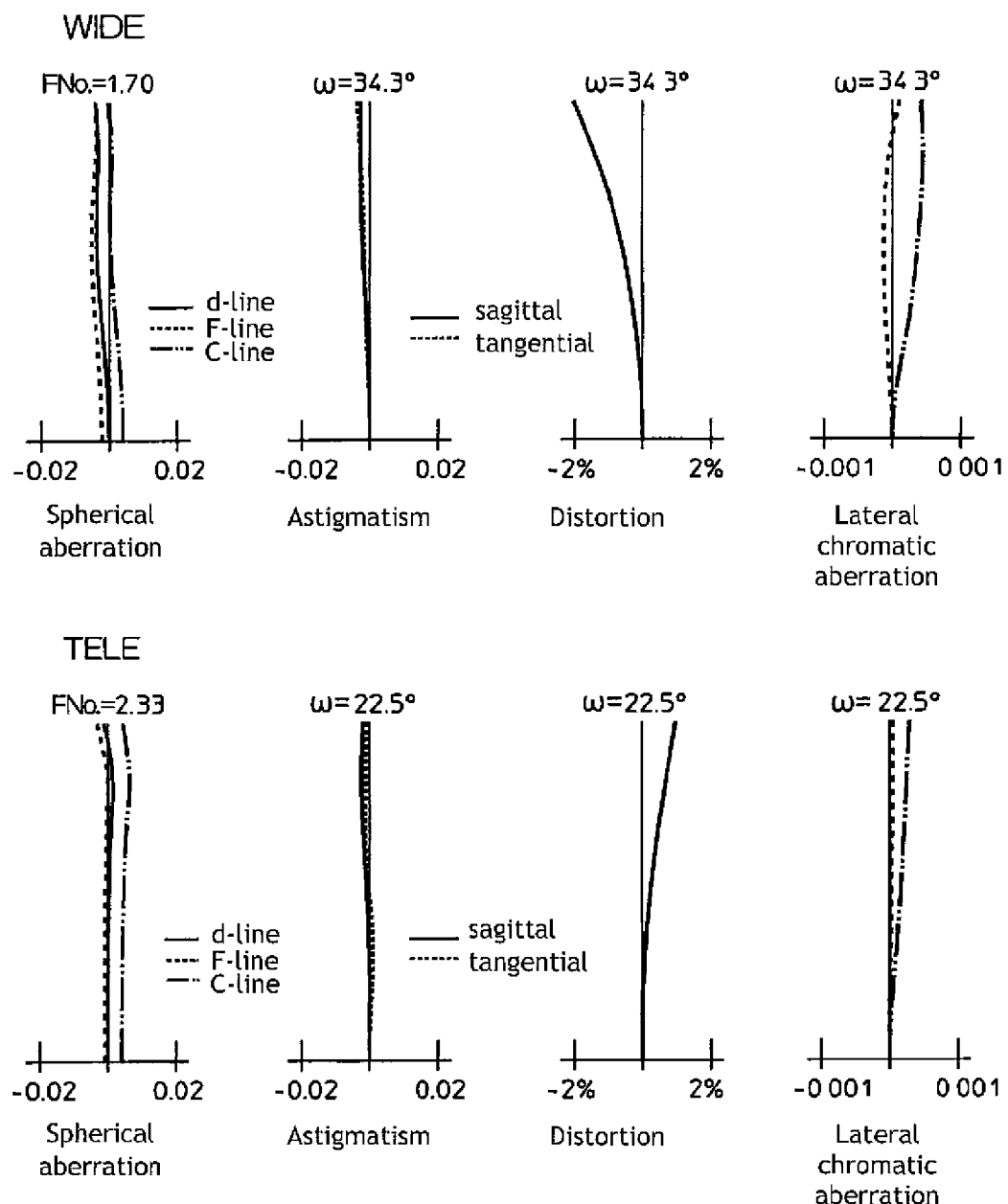
FIG. 14 is aberration charts of the projecting zoom lens according to Example 4.

FIG. 14 is aberration charts showing various aberrations (spherical aberration, astigmatism, distortion, and lateral chromatic aberration) of the projecting zoom lens according to Example 4.

As apparent from FIG. 14, according to the projecting zoom lens in Example 4, the angle of view 2ω was wide, that is, 68.6 degrees at the wide angle end and the respective aberrations were corrected satisfactorily. In particular, since the tenth lens $L_{10}$ was formed of the aspheric lens, the field curvature of the S image surface could be very satisfactorily corrected. Also, since a value of the coefficient of linear expansion of the tenth lens $L_{10}$ was set to $101 \times 10^{-7}$, this tenth lens $L_{10}$ was hardly influenced by a temperature change. Thus, this lens could be arranged in a position on which a luminous flux is limited. Also, in Example 4, a zoom ratio was set to a high magnification of 1.6.

Also, as shown in Table 21, according to the projecting zoom lens in Example 4, Conditional Expressions (1) to (5), (6C), (7) to (10) are satisfied.

Example 5

Figure 5:
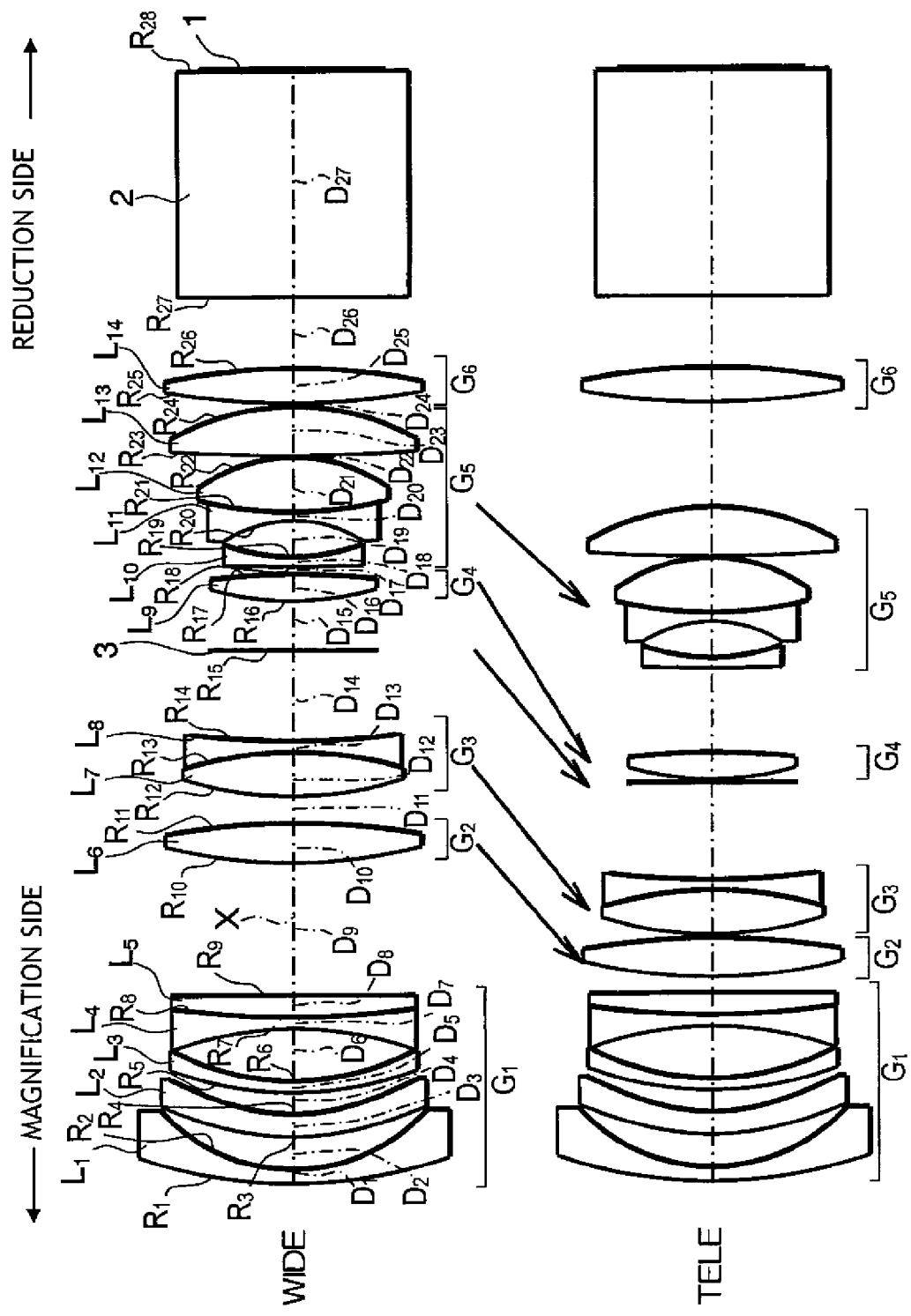
FIG. 5 is a lens configurative view of a projecting zoom lens according to Example 5 of the invention at a wide angle end and a telephoto end.

A schematic configuration of a projecting zoom lens according to Example 5 is shown in FIG. 5. The projecting zoom lens according to Example 5 was constructed substantially similarly to that in Example 4. In explanation of corresponding drawings, the like reference symbols are affixed to the like elements and thus redundant explanations will be omitted herein.

Example 5 is different from Example 4 mainly in that the mask 3 is moved independently of the respective lens groups.

In this Example, an "aspheric lens whose effective aperture is smallest" was a tenth lens $L_{10}$, and a pupil position was near the magnification side of a surface of a ninth lens $L_9$ on the magnification side.

In this Example 5, radii of curvature R of the respective lens surfaces, center thicknesses of the respective lenses, air distances D between the respective lens, refractive indexes Nd of the respective lenses with respect to the d-line and Abbe numbers vd of the respective lenses are given on the upper part of Table 9.

Also, a distance between the first lens group $G_1$ and the second lens group $G_2$ (variable distance 9), a distance between the second lens group $G_2$ and the third lens group $G_3$ (variable distance 11), a distance between the third lens group $G_3$ and the mask 3 (variable distance 14), a distance between the mask 3 and the fourth lens group $G_4$ (variable distance 15), a distance between the fourth lens group $G_4$ and the fifth lens group $G_5$ (variable distance 17), and a distance between the fifth lens group $G_5$ and the sixth lens group $G_6$ (variable distance 24) at the focal length 1.0 (wide angle end) and the focal length 1.6 (telephoto end) are given on the lower part of Table 9.

Also, the third surface, the fourth surface and the eighteenth surface, the nineteenth surface were formed as the aspheric surface respectively. In Table 10, values of respective constants K, $A_3$, $A_4$, $A_5$, $A_6$, $A_7$, $A_8$, $A_9$, $A_{10}$, $A_{11}$, $A_{12}$, $A_{13}$, $A_{14}$ as to these aspheric surfaces in the above aspheric formula are given.

TABLE 9

| Surface number | R | D | Nd | vd |
|---|---|---|---|---|
| 1 | 2.8433 | 0.0834 | 1.58913 | 61.1 |
| 2 | 1.0667 | 0.1916 | | |
| 3* | 1.5839 | 0.1335 | 1.50842 | 56.4 |
| 4* | 1.1552 | 0.1276 | | |
| 5 | 2.1197 | 0.0688 | 1.48749 | 70.2 |
| 6 | 1.5365 | 0.3079 | | |
| 7 | −2.1175 | 0.0672 | 1.48749 | 70.2 |
| 8 | 5.0373 | 0.1290 | 1.80518 | 25.4 |
| 9 | −160.5289 | 0.7639(variable) | | |
| 10 | 3.1439 | 0.2336 | 1.78590 | 44.2 |
| 11 | −4.4381 | 0.1585(variable) | | |
| 12 | 2.1450 | 0.2603 | 1.83400 | 37.2 |

TABLE 9-continued

| | | | | |
|---|---|---|---|---|
| 13 | −2.2670 | 0.0626 | 1.84666 | 23.8 |
| 14 | 4.7375 | 0.5392(variable) | | |
| 15 | ∞ | 0.2921(variable) (mask) | | |
| 16 | 1.8046 | 0.1568 | 1.48749 | 70.2 |
| 17 | −4.5795 | 0.0416(variable) | | |
| 18* | 4.5330 | 0.0626 | 1.68893 | 31.1 |
| 19* | 1.0802 | 0.2141 | | |
| 20 | −0.7686 | 0.0501 | 1.83400 | 37.2 |
| 21 | 2.3002 | 0.3250 | 1.49700 | 81.5 |
| 22 | −0.9763 | 0.0083 | | |
| 23 | 10.5411 | 0.2902 | 1.74320 | 49.3 |
| 24 | −1.4981 | 0.0207(variable) | | |
| 25 | 4.4746 | 0.2086 | 1.71300 | 53.9 |
| 26 | −3.7432 | 0.4173 | | |
| 27 | ∞ | 1.3353 | 1.51633 | 64.1 |
| 28 | ∞ | | | |

Variable separation

| Focal distance | 1.0(wide end) | 1.6(telephoto end) |
|---|---|---|
| $D_9$ | 0.7639 | 0.0805 |
| $D_{11}$ | 0.1585 | 0.0208 |
| $D_{14}$ | 0.5392 | 0.5711 |
| $D_{15}$ | 0.2921 | 0.0209 |
| $D_{17}$ | 0.0416 | 0.4991 |
| $D_{24}$ | 0.0207 | 0.6236 |

*Aspheric surface

TABLE 10

Aspheric surface coefficient

| surface | K | $A_3$ | $A_4$ | $A_5$ | $A_6$ | $A_7$ |
|---|---|---|---|---|---|---|
| 3 | 0.9961 | 0.0000 | $-9.4855 \times 10^{-2}$ | 0.0000 | $8.5219 \times 10^{-2}$ | 0.0000 |
| 4 | 04199 | 0.0000 | $-1.3306 \times 10^{-1}$ | 0.0000 | $7.7219 \times 10^{-2}$ | 0.0000 |
| 18 | 1.0000 | 0.0000 | $-5.6907 \times 10^{-1}$ | 0.0000 | 1.1231 | 0.0000 |
| 19 | 1.0000 | 0.0000 | $-5.0657 \times 10^{-1}$ | 0.0000 | 1.1489 | 0.0000 |

| surface | $A_8$ | $A_9$ | $A_{10}$ | $A_{11}$ | $A_{12}$ | $A_{13}$ | $A_{14}$ |
|---|---|---|---|---|---|---|---|
| 3 | $-1.1245 \times 10^{-1}$ | 0.0000 | $-4.8829 \times 10^{-2}$ | 0.0000 | $7.4325 \times 10^{-2}$ | 0.0000 | $3.020 \times 10^{-4}$ |
| 4 | $-4.0733 \times 10^{-2}$ | 0.0000 | $-4.9943 \times 10^{-1}$ | 0.0000 | $7.2582 \times 10^{-1}$ | 0.0000 | $-2.956 \times 10^{-1}$ |
| 18 | $-1.4609 \times 10^{-1}$ | 0.0000 | −1.9548 | 0.0000 | 0.0000 | 0.0000 | 0.0000 |
| 19 | $-1.0401 \times 10^{-1}$ | 0.0000 | −3.3752 | 0.0000 | 0.0000 | 0.0000 | 0.0000 |

Also, numerical values corresponding to above Conditional Expressions in Example 5 are given in Table 21.

Figure 15:
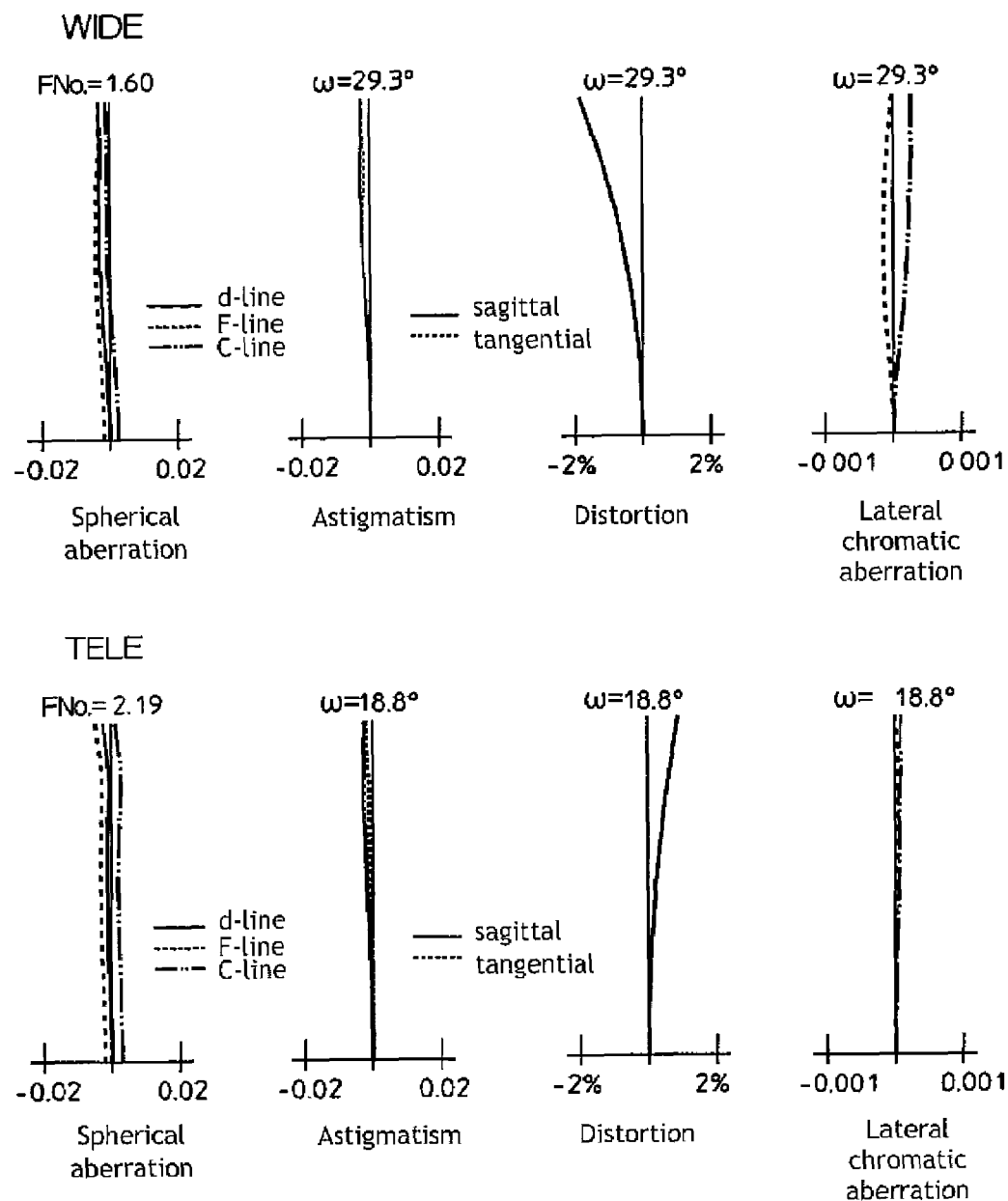
FIG. 15 is aberration charts of the projecting zoom lens according to Example 5.

FIG. 15 is aberration charts showing various aberrations (spherical aberration, astigmatism, distortion, and lateral chromatic aberration) of the projecting zoom lens according to Example 5.

As apparent from FIG. 15, according to the projecting zoom lens in Example 5, the angle of view 2ω was wide, that is, 58.6 degrees at the wide angle end and respective aberrations were corrected satisfactorily. In particular, since the tenth lens $L_{10}$ was formed of the aspheric lens, the field curvature of the S image surface could be very satisfactorily corrected. Also, since a value of the coefficient of linear expansion of the tenth lens $L_{10}$ was set to $101 \times 10^{-7}$, this tenth lens $L_{10}$ was hardly influenced by a temperature change and thus this lens could be arranged in a position on which a luminous flux is limited. Also, in Example 5, a zoom ratio was set to a high magnification of 1.6.

Also, as shown in Table 21, according to the projecting zoom lens in Example 5, Conditional Expressions (1) to (5), (6A), (6C), (7) to (10) are satisfied.

Example 6

Figure 6:
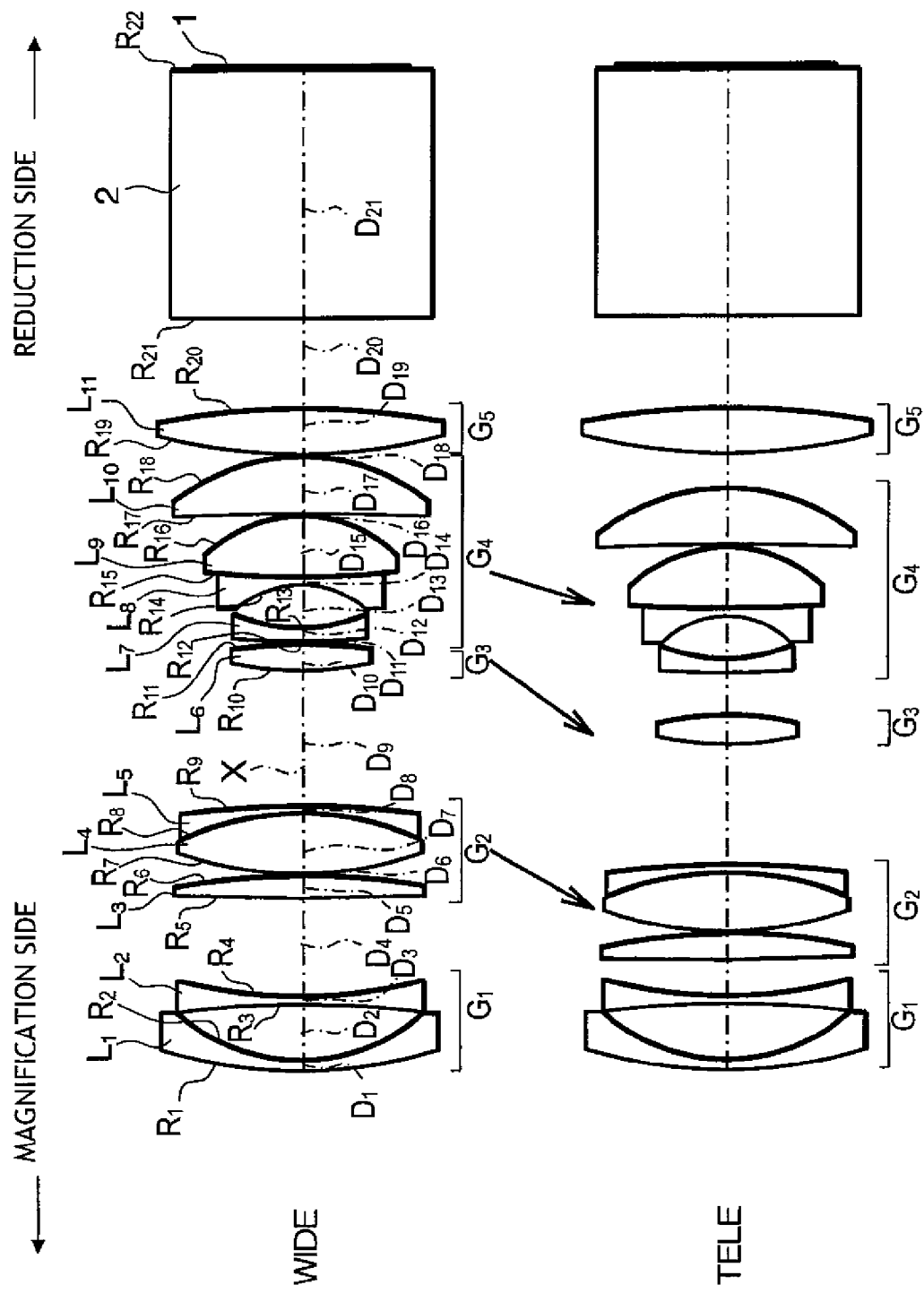
FIG. 6 is a lens configurative view of a projecting zoom lens according to Example 6 of the invention at a wide angle end and a telephoto end.

A schematic configuration of a projecting zoom lens according to Example 6 is shown in FIG. 6. The projecting zoom lens according to Example 6 was constructed substantially similarly to that in Example 1. In explanation of corresponding drawings, the like reference symbols are affixed to the like elements and thus redundant explanations will be omitted herein.

Example 6 is different from Example 1 mainly in that a five-group configuration is employed, that the moving group includes the second lens group $G_2$ to the fourth lens group $G_4$, that lens configurations except the third lens group $G_3$ are different, and that no mask is provided.

In the configurations of the first lens group $G_1$, the second lens group $G_2$, the fourth lens group $G_4$, and the fifth lens group $G_5$ of the projecting zoom lens according to Example 6, the first lens group $G_1$ included a first lens $L_1$ formed of a negative meniscus lens having a convex surface directed to the magnification side, and a second lens $L_2$ formed of a biconcave lens. Also, the second lens group $G_2$ included a third lens $L_3$ formed of a biconvex lens, and a cemented lens constructed by a fourth lens $L_4$ formed of a biconvex lens and a fifth lens $L_5$ formed of a negative meniscus lens having a convex surface directed to the reduction side. Also, the fourth lens group $G_4$ included a seventh lens $L_7$ formed of a negative meniscus lens having a convex surface directed to the magnification side, a cemented lens constructed by an eighth lens $L_8$ formed of a biconcave lens and a ninth lens $L_9$ formed of a biconvex lens, and a tenth lens $L_{10}$ formed of a positive meniscus lens having a convex surface directed to the reduction side. Also, the fifth lens group $G_5$ included an eleventh lens $L_{11}$ formed of a biconvex lens. In this Example, an "aspheric lens whose effective aperture is smallest" was the seventh lens $L_7$, and a pupil position was near the magnification side of a surface of a sixth lens $L_6$ on the magnification side.

Although not shown in FIG. 6, a mask may be provided and also a diaphragm may be used as the mask.

In this Example 6, radii of curvature R of the respective lens surfaces, center thicknesses of the respective lenses, air distances D between the respective lens, refractive indexes Nd of the respective lenses with respect to the d-line and Abbe numbers νd of respective lenses are given on the upper part of Table 11.

Also, a distance between the first lens group $G_1$ and the second lens group $G_2$ (variable distance 4), a distance between the second lens group $G_2$ and the third lens group $G_3$ (variable distance 9), a distance between the third lens group $G_3$ and the fourth lens group $G_4$ (variable distance 11), and a distance between the fourth lens group $C_4$ and the fifth lens group $G_5$ (variable distance 18) at the focal length 1.0 (wide angle end) and the focal length 1.3 (telephoto end) are given on the lower part of Table 11.

Also, the twelfth surface and the thirteenth surface were formed of the aspheric surfaces, respectively. In Table 12, values of the respective constants K, $A_3$, $A_4$, $A_5$, $A_6$, $A_7$, $A_8$, $A_9$, $A_{10}$ as to these aspheric surfaces in the above aspheric formula are given.

TABLE 11

| Surface number | R | D | Nd | vd |
|---|---|---|---|---|
| 1 | 2.5200 | 0.0557 | 1.70336 | 56.3 |
| 2 | 0.9535 | 0.2888 | | |
| 3 | −5.8498 | 0.0395 | 1.67005 | 58.0 |
| 4 | 2.3556 | 0.4881(variable) | | |
| 5 | 314.1502 | 0.1344 | 1.77691 | 26.2 |
| 6 | −3.3862 | 0.0093 | | |
| 7 | 1.9315 | 0.3131 | 1.83500 | 37.7 |
| 8 | −1.5514 | 0.0395 | 1.83500 | 23.3 |
| 9 | −4.7592 | 0.6985(variable) | | |
| 10 | 1.4598 | 0.1511 | 1.49482 | 80.8 |
| 11 | −1.9515 | 0.0127(variable) | | |
| 12* | 3.8888 | 0.0697 | 1.83500 | 44.5 |
| 13* | 0.8715 | 0.2215 | | |
| 14 | −0.5144 | 0.0395 | 1.83499 | 24.0 |
| 15 | 5.2763 | 0.3202 | 1.52536 | 76.1 |
| 16 | −0.7157 | 0.0093 | | |
| 17 | −24.0001 | 0.2953 | 1.58653 | 66.7 |
| 18 | −1.0818 | 0.0139(variable) | | |
| 19 | 3.2535 | 0.2384 | 1.83500 | 29.0 |
| 20 | −4.2000 | 0.4645 | | |
| 21 | ∞ | 1.3007 | 1.51633 | 64.1 |
| 22 | ∞ | | | |

| Variable separation | | |
|---|---|---|
| Focal distance | 1.0(wide end) | 1.3(telephoto end) |
| $D_4$ | 0.4881 | 0.1768 |
| $D_9$ | 0.6985 | 0.6218 |
| $D_{11}$ | 0.0127 | 0.2259 |
| $D_{18}$ | 0.0139 | 0.1888 |

*Aspheric surface

TABLE 12

| | | Aspheric surface coefficient | | | | |
|---|---|---|---|---|---|---|
| surface | K | $A_3$ | $A_4$ | $A_5$ | $A_6$ | $A_7$ |
| 12 | 0.5869 | 0.0000 | $-1.3992 \times 10^{-1}$ | 0.0000 | $9.5225 \times 10^{-3}$ | 0.0000 |
| 13 | 0.9605 | 0.0000 | $-2.2704 \times 10^{-2}$ | 0.0000 | $3.3623 \times 10^{-3}$ | 0.0000 |

| surface | $A_8$ | $A_9$ | $A_{10}$ |
|---|---|---|---|
| 12 | $1.3179 \times 10^{-2}$ | 0.0000 | $-4.4864 \times 10^{-3}$ |
| 13 | $-7.5512 \times 10^{-5}$ | 0.0000 | $-1.1795 \times 10^{-3}$ |

Also, numerical values corresponding to above Conditional Expressions in Example 6 are given in Table 21.

FIG. 16 is aberration charts showing various aberrations (spherical aberration, astigmatism, distortion, and lateral chromatic aberration) of the projecting zoom lens according to Example 6.

As apparent from FIG. 16, according to the projecting zoom lens in Example 6, the angle of view 2ω was wide, that is, 60.6 degrees at the wide angle end and respective aberrations were corrected satisfactorily. In particular, since the seventh lens $L_7$ was formed of the aspheric lens, the field curvature of the S image surface could be very satisfactorily corrected. Also, since a value of the coefficient of linear expansion of the seventh lens $L_7$ was set to $70 \times 10^{-7}$, this seventh lens $L_7$ was hardly influenced by a temperature change. Thus, this lens could be arranged in a position on which a luminous flux is limited.

Also, as shown in Table 21, according to the projecting zoom lens in Example 6, Conditional Expressions (1) to (5), (6A), (6B), (6C), (7), (9), (10) are satisfied.

Example 7

Figure 7:
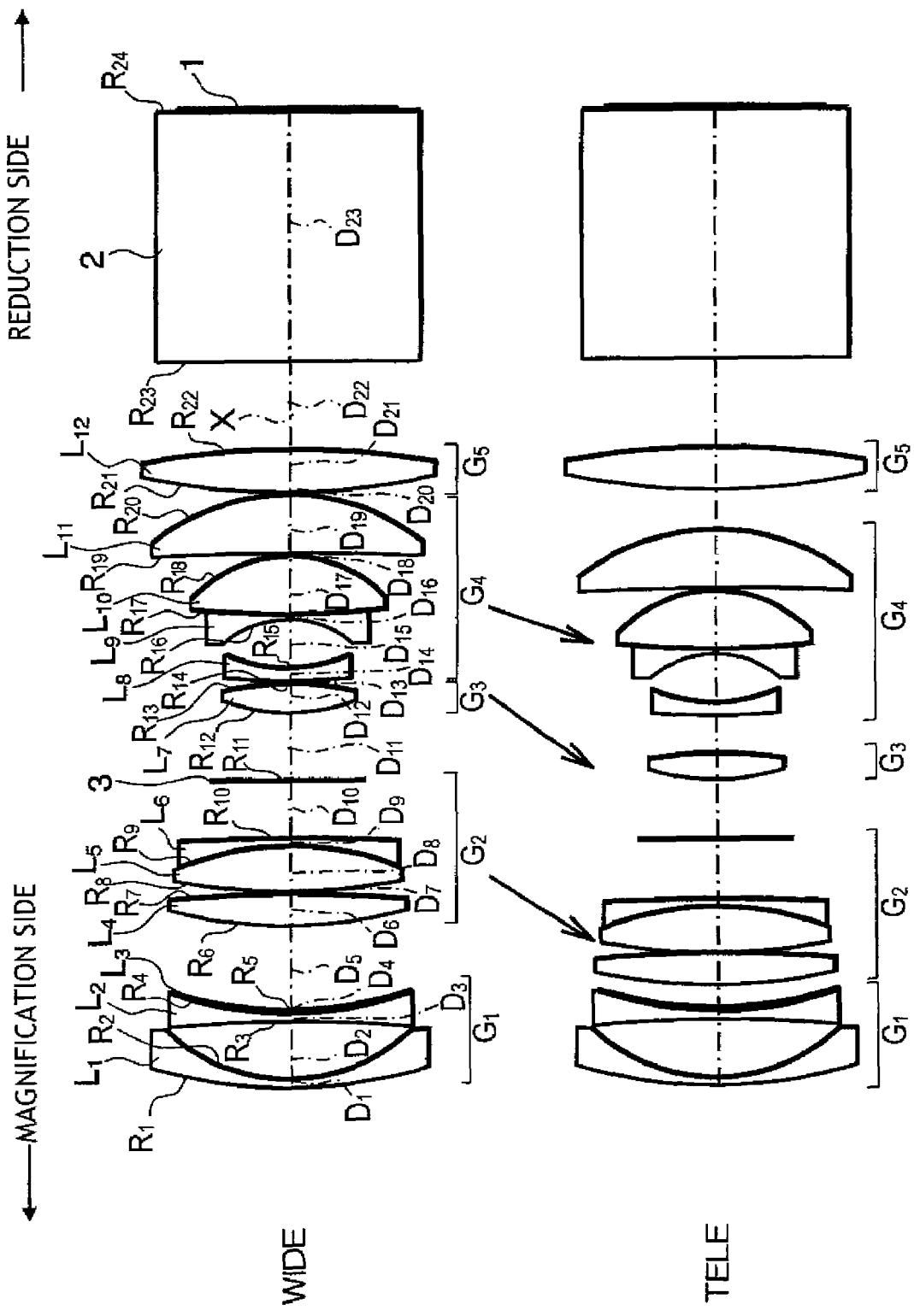
FIG. 7 is a lens configurative view of a projecting zoom lens according to Example 7 of the invention at a wide angle end and a telephoto end.

A schematic configuration of a projecting zoom lens according to Example 7 is shown in FIG. 7. The projecting zoom lens according to Example 7 was constructed substantially similarly to that in Example 6. In explanation of corresponding drawings, the like reference symbols are affixed to the like elements and thus redundant explanations will be omitted herein.

Example 7 is different from Example 6 mainly in a lens configuration of the first lens group $G_1$, and in that the mask 3 is provided on the reduction side of the sixth lens group $G_6$ and is contained in the second lens group $G_2$.

In the projecting zoom lens according to Example 7, the first lens group $G_1$ included a first lens $L_1$ formed of a negative meniscus lens having a convex surface directed to the magnification side, and a composite aspheric lens constructed by pasting a third lens $L_3$ formed of a thin resin lens to a second lens $L_2$ formed of a biconcave lens. In this Example, an "aspheric lens whose effective aperture is smallest" was an eighth lens $L_8$, and a pupil position was near the magnification side of a surface of a seventh lens $L_7$ on the magnification side.

In this Example 7, radii of curvature R of the respective lens surfaces, center thicknesses of the respective lenses, air distances D between the respective lens, refractive indexes Nd of the respective lenses with respect to the d-line and Abbe numbers vd of the respective lenses are given on the upper part of Table 13.

Also, a distance between the first lens group $G_1$ and the second lens group $G_2$ (variable distance 5), a distance between the second lens group $G_2$ and the third lens group $G_3$ (variable distance 11), a distance between the third lens group $G_3$ and the fourth lens group $G_4$ (variable distance 13), and a distance between the fourth lens group $G_4$ and the fifth lens group $G_5$ (variable distance 20) at the focal length 1.0 (wide angle end) and the focal length 1.3 (telephoto end) are given on the lower part of Table 13.

Also, the fifth surface and the fourteenth surface and the fifteenth surface were formed of the aspheric surfaces, respectively. In Table 14, values of respective constants K, $A_3$, $A_4, A_5, A_6, A_7, A_8, A_9, A_{10}$ as to these aspheric surfaces in the above aspheric formula are given.

TABLE 13

| Surface number | R | D | Nd | vd |
|---|---|---|---|---|
| 1 | 2.3953 | 0.0534 | 1.67790 | 55.3 |
| 2 | 0.9156 | 0.3014 | | |
| 3 | −6.2493 | 0.0395 | 1.49700 | 81.5 |
| 4 | 1.8709 | 0.0093 | 1.52771 | 41.8 |
| 5* | 1.8363 | 0.4360(variable) | | |
| 6 | 2.5317 | 0.1692 | 1.84666 | 23.8 |
| 7 | −6.6245 | 0.0070 | | |
| 8 | 3.3828 | 0.2384 | 1.83400 | 37.2 |
| 9 | −1.5389 | 0.0395 | 1.84666 | 23.8 |
| 10 | −11.9017 | 0.3018 | | |
| 11 | ∞ | 0.3624(variable) (mask) | | |
| 12 | 1.1060 | 0.1449 | 149700 | 81.5 |
| 13 | −1.8680 | 0.0126(variable) | | |
| 14* | 3.7788 | 0.0696 | 1.68893 | 31.1 |
| 15* | 0.7439 | 0.2516 | | |
| 16 | −0.5103 | 0.0325 | 1.84666 | 23.8 |
| 17 | 5.9371 | 0.3034 | 1.49700 | 81.5 |
| 18 | −0.6979 | 0.0070 | | |
| 19 | −27.6337 | 0.3150 | 1.71300 | 53.9 |
| 20 | −1.1268 | 0.0139(variable) | | |
| 21 | 3.7457 | 0.2138 | 1.84666 | 23.8 |
| 22 | −4.6405 | 0.4643 | | |
| 23 | ∞ | 1.3000 | 1.51633 | 64.1 |
| 24 | ∞ | | | |

| Variable separation | | |
|---|---|---|
| Focal distance | 1.0(wide end) | 1.3(telephoto end) |
| $D_5$ | 0.4360 | 0.1117 |
| $D_{11}$ | 0.3624 | 0.3180 |
| $D_{13}$ | 0.0126 | 0.1878 |
| $D_{20}$ | 0.0139 | 0.2073 |

*Aspheric surface

TABLE 14

Aspheric surface coefficient

| surface | K | $A_3$ | $A_4$ | $A_5$ | $A_6$ | $A_7$ |
|---|---|---|---|---|---|---|
| 5 | 0.1981 | 0.0000 | $-1.9276 \times 10^{-2}$ | 0.0000 | $-1.8743 \times 10^{-2}$ | 0.0000 |
| 14 | 0.5776 | 0.0000 | $-1.4610 \times 10^{-1}$ | 0.0000 | $5.3608 \times 10^{-3}$ | 0.0000 |
| 15 | 1.1360 | 0.0000 | $-7.7066 \times 10^{-2}$ | 0.0000 | $6.3039 \times 10^{-3}$ | 0.0000 |

| surface | $A_8$ | $A_9$ | $A_{10}$ |
|---|---|---|---|
| 5 | $-9.37860 \times 10^{-4}$ | 0.0000 | $-6.7569 \times 10^{-5}$ |
| 14 | $1.31900 \times 10^{-2}$ | 0.0000 | $-4.5085 \times 10^{-3}$ |
| 15 | $-9.81960 \times 10^{-6}$ | 0.0000 | $-1.1888 \times 10^{-3}$ |

Also, numerical values corresponding to above Conditional Expressions in Example 7 are given in Table 21.

Figure 17:
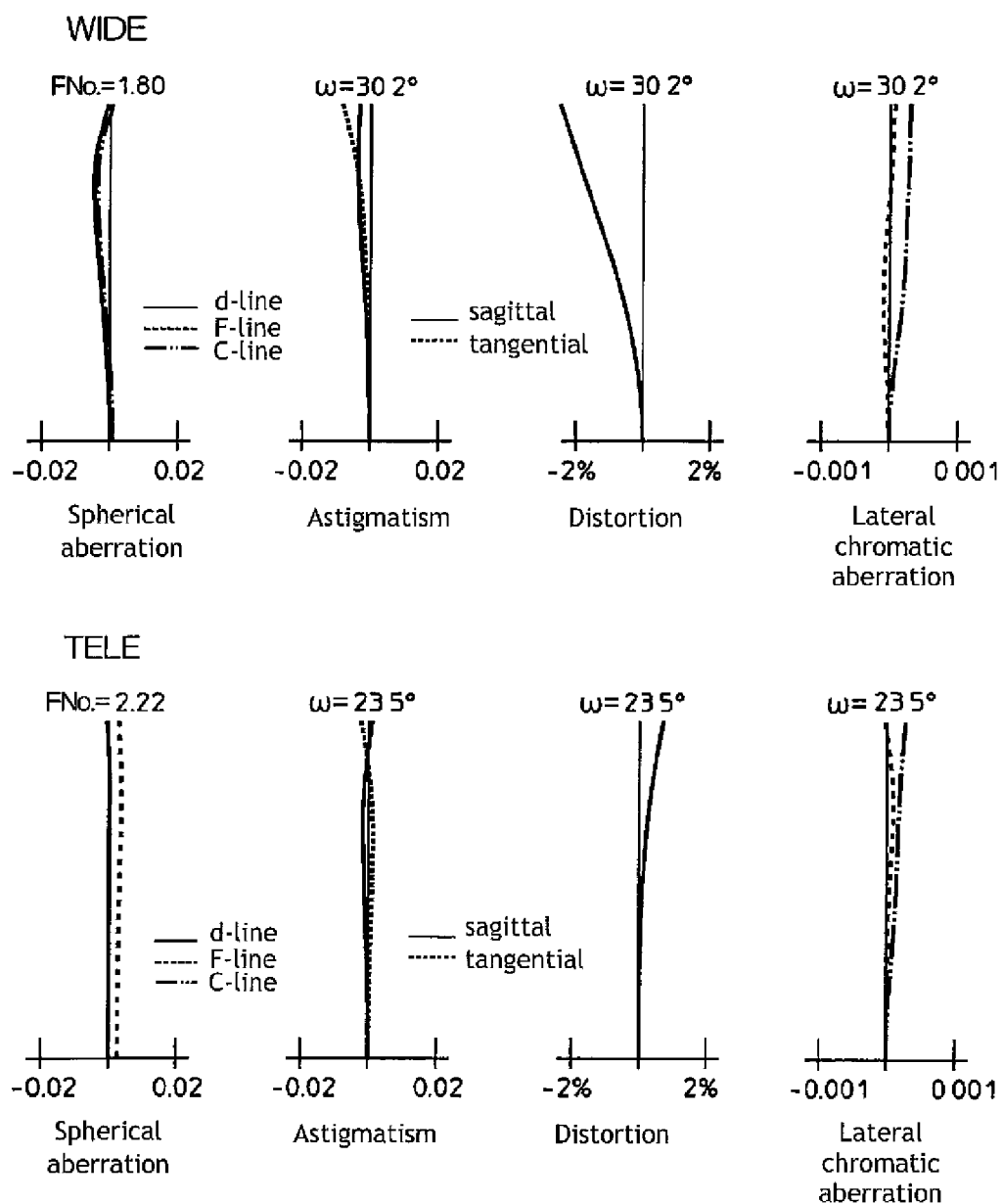
FIG. 17 is aberration charts of the projecting zoom lens according to Example 7.

FIG. 17 is aberration charts showing various aberrations (spherical aberration, astigmatism, distortion, and lateral chromatic aberration) of the projecting zoom lens according to Example 7.

As apparent from FIG. 17, according to the projecting zoom lens in Example 7, the angle of view 2ω was wide, that is, 60.4 degrees at the wide angle end and the respective aberrations were corrected satisfactorily. In particular, since the eighth lens $L_8$ was formed of the aspheric lens, the field curvature of the S image surface could be very satisfactorily corrected. Also, since a value of the coefficient of linear expansion of the eighth lens $L_8$ was set to $101 \times 10^{-7}$, this eighth lens $L_8$ was hardly influenced by a temperature change. Thus, this lens could be arranged in a position on which a luminous flux is limited.

Also, as shown in Table 21, according to the projecting zoom lens in Example 7, Conditional Expressions (1) to (5), (6A) (6B), (6C), (7), (9), (10) are satisfied.

Example 8

Figure 8:
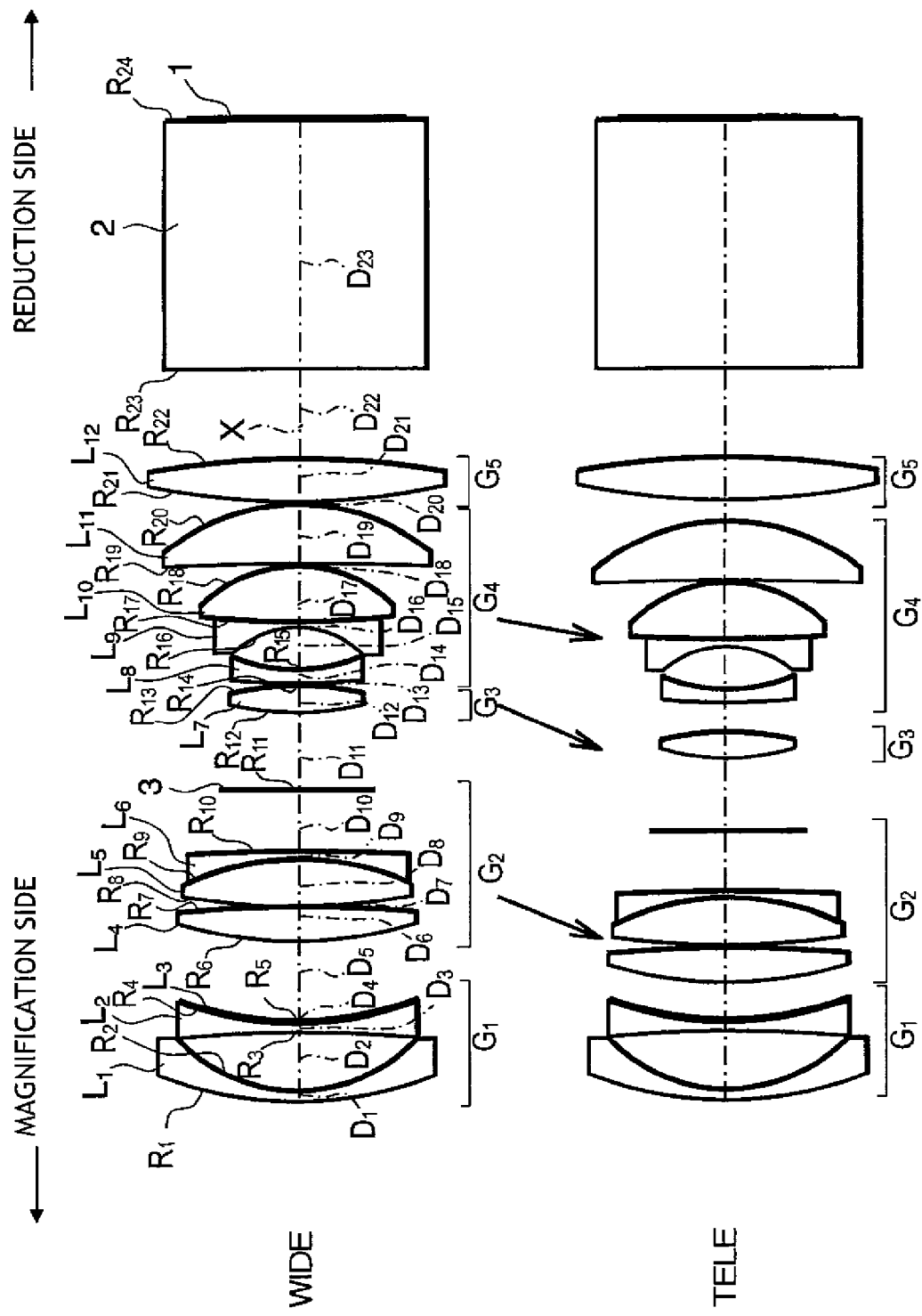
FIG. 8 is a lens configurative view of a projecting zoom lens according to Example 8 of the invention at a wide angle end and a telephoto end.

A schematic configuration of a projecting zoom lens according to Example 8 is shown in FIG. 8. The projecting zoom lens according to Example 8 was constructed substantially similarly to that in Example 7. In explanation of corresponding drawings, the like reference symbols are affixed to the like elements and thus redundant explanations will be omitted herein.

In this Example, an "aspheric lens whose effective aperture is smallest" was an eighth lens $L_8$, and a pupil position was near the magnification side of a surface of a seventh lens $L_7$ on the magnification side.

In this Example 8, radii of curvature R of the respective lens surfaces, center thicknesses of the respective lenses, air distances D between the respective lens, refractive indexes Nd of the respective lenses with respect to the d-line and Abbe numbers vd of the respective lenses are given on the upper part of Table 15.

Also, a distance between the first lens group $G_1$ and the second lens group $G_2$ (variable distance 5), a distance between the second lens group $G_2$ and the third lens group $G_3$ (variable distance 11), a distance between the third lens group $G_3$ and the fourth lens group $G_4$ (variable distance 13), and a distance between the fourth lens group $G_4$ and the fifth lens group $G_5$ (variable distance 20) at the focal length 1.0 (wide angle end) and the focal length 1.2 (telephoto end) are given on the lower part of Table 15.

Also, the fifth surface, and the fourteenth surface and the fifteenth surface were formed as the aspheric surface respectively. In Table 16, values of the respective constants K, $A_3$, $A_4, A_5, A_6, A_7, A_8, A_9, A_{10}$ as to these aspheric surfaces in the above aspheric formula are given.

TABLE 15

| Surface number | R | D | Nd | vd |
|---|---|---|---|---|
| 1 | 2.1124 | 0.0634 | 1.67790 | 55.3 |
| 2 | 0.8782 | 0.3061 | | |
| 3 | −7.0099 | 0.0395 | 1.48749 | 70.2 |
| 4 | 1.7129 | 0.0093 | 1.52771 | 41.8 |

TABLE 15-continued

| | | | | |
|---|---|---|---|---|
| 5* | 1.4758 | 0.4066(variable) | | |
| 6 | 2.1044 | 0.1829 | 1.84666 | 23.8 |
| 7 | −7.3952 | 0.0070 | | |
| 8 | 3.6788 | 0.2495 | 1.83400 | 37.2 |
| 9 | −1.3668 | 0.0395 | 1.84666 | 23.8 |
| 10 | −12.0944 | 0.3021 | | |
| 11 | ∞ | 0.4121(variable) (mask) | | |
| 12 | 1.2638 | 0.1388 | 1.49700 | 81.5 |
| 13 | −1.7211 | 0.0130(variable) | | |
| 14* | 4.2471 | 0.0697 | 1.68893 | 31.1 |
| 15* | 0.8129 | 0.2257 | | |
| 16 | −0.5208 | 0.0325 | 1.84666 | 23.8 |
| 17 | 6.0355 | 0.2972 | 1.49700 | 81.5 |
| 18 | −0.7178 | 0.0070 | | |
| 19 | −18.1054 | 0.3112 | 1.71300 | 53.9 |
| 20 | −1.1119 | 0.0139(variable) | | |
| 21 | 3.8683 | 0.2164 | 1.84666 | 23.8 |
| 22 | −4.2862 | 0.4647 | | |
| 23 | ∞ | 1.3012 | 1.51633 | 64.1 |
| 24 | ∞ | | | |

Variable separation

| Focal distance | 1.0(wide end) | 1.2(telephoto end) |
|---|---|---|
| $D_5$ | 0.4066 | 0.1870 |
| $D_{11}$ | 0.4121 | 0.3843 |
| $D_{13}$ | 0.0130 | 0.1568 |
| $D_{20}$ | 0.0139 | 0.1177 |

*Aspheric surface

TABLE 16

Aspheric surface coefficient

| surface | K | $A_3$ | $A_4$ | $A_5$ | $A_6$ | $A_7$ |
|---|---|---|---|---|---|---|
| 5 | 0.1813 | 0.0000 | −2.2857 × $10^{-2}$ | 0.0000 | −4.1343 × $10^{-2}$ | 0.0000 |
| 14 | 0.5647 | 0.0000 | −2.1886 × $10^{-1}$ | 0.0000 | 5.7183 × $10^{-4}$ | 0.0000 |
| 15 | 1.1377 | 0.0000 | −1.0469 × $10^{-1}$ | 0.0000 | 9.6205 × $10^{-3}$ | 0.0000 |

| surface | $A_8$ | $A_9$ | $A_{10}$ |
|---|---|---|---|
| 5 | −2.26600 × $10^{-3}$ | 0.0000 | −8.6314 × $10^{-4}$ |
| 14 | 1.38880 × $10^{-2}$ | 0.0000 | −3.9325 × $10^{-3}$ |
| 15 | 4.27240 × $10^{-4}$ | 0.0000 | 3.7225 × $10^{-4}$ |

Also, numerical values corresponding to above Conditional Expressions in Example 8 are given in Table 21.

Figure 18:
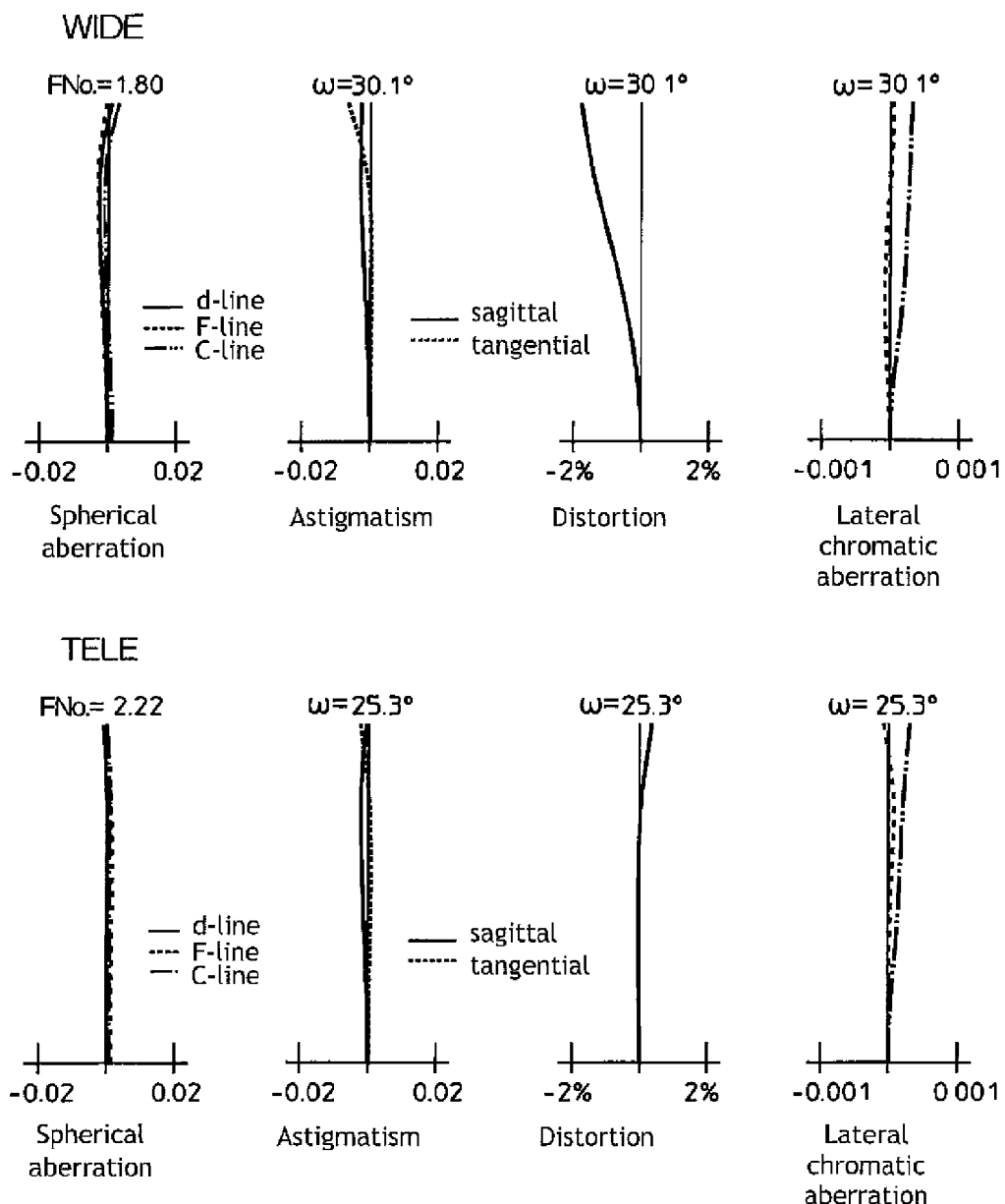
FIG. 18 is aberration charts of the projecting zoom lens according to Example 8.

FIG. 18 is aberration charts showing various aberrations (spherical aberration, astigmatism, distortion, and lateral chromatic aberration) of the projecting zoom lens according to Example 8.

As apparent from FIG. 18, according to the projecting zoom lens in Example 8, the angle of view 2ω was wide, that is, 60.2 degrees at the wide angle end and the respective aberrations were corrected satisfactorily. In particular, since the eighth lens $L_8$ was formed of the aspheric lens, the field curvature of the S image surface could be very satisfactorily corrected. Also, since a value of the coefficient of linear expansion of the eighth lens $L_8$ was set to 101×$10^{-7}$, this eighth lens $L_8$ was hardly influenced by a temperature change. Thus, this lens could be arranged in a position on which a luminous flux is limited.

Also, as shown in Table 21, according to the projecting zoom lens in Example 8, Conditional Expressions (1) to (5), (6A), (6B), (6C), (7), (9), (10) are satisfied.

Example 9

Figure 9:
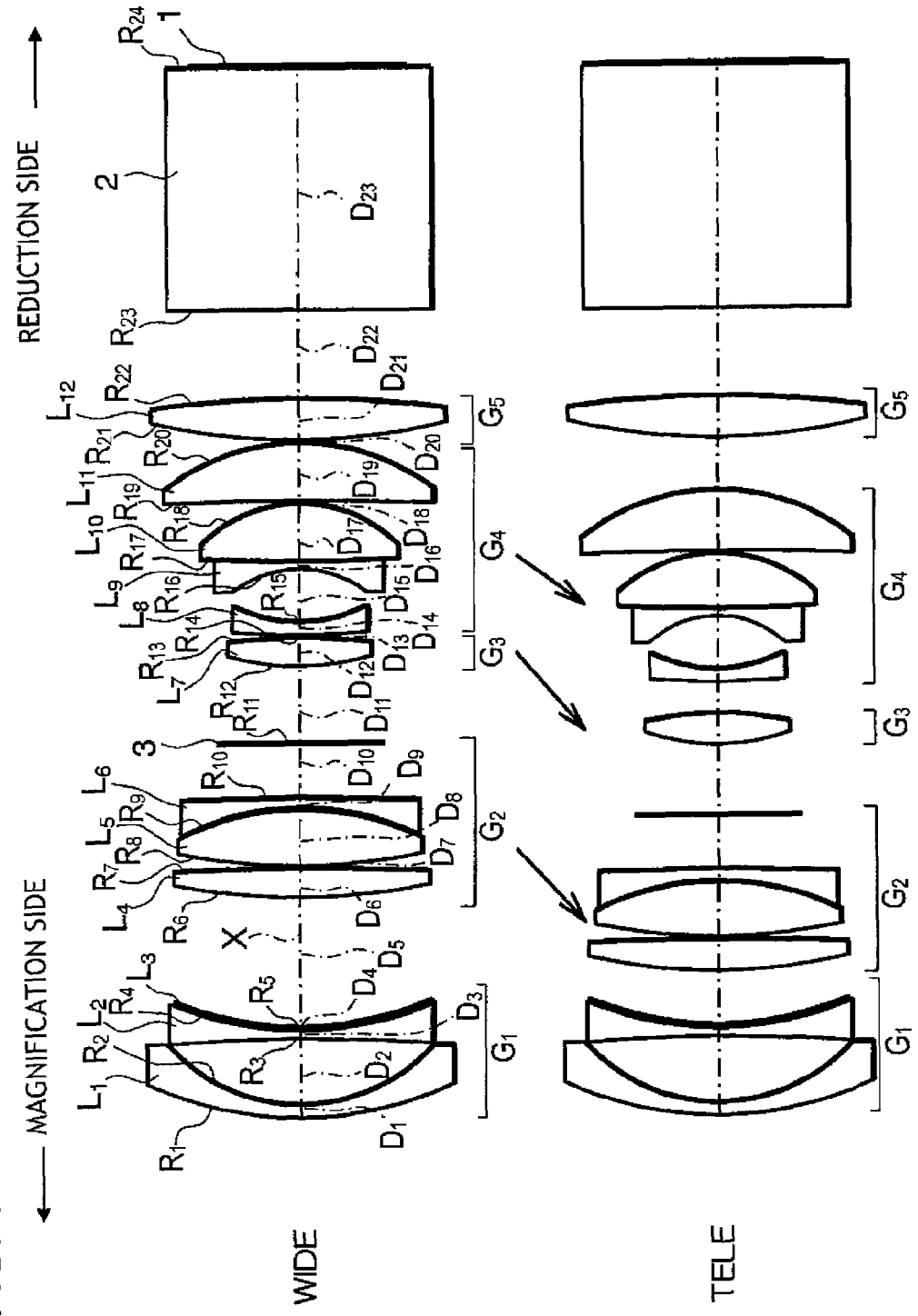
FIG. 9 is a lens configurative view of a projecting zoom lens according to Example 9 of the invention at a wide angle end and a telephoto end.

A schematic configuration of a projecting zoom lens according to Example 9 is shown in FIG. 9. The projecting zoom lens according to Example 9 was constructed substantially similarly to that in Example 7. In explanation of corresponding drawings, the like reference symbols are affixed to the like elements and thus redundant explanations will be omitted herein.

In this Example, an "aspheric lens whose effective aperture is smallest" was an eighth lens $L_8$, and a pupil position was near the magnification side of a surface of a seventh lens $L_7$ on the magnification side.

In this Example 9, radii of curvature R of the respective lens surfaces, center thicknesses of the respective lenses, air distances D between the respective lens, refractive indexes Nd of the respective lenses with respect to the d-line and Abbe numbers vd of respective lenses are given on the upper part of Table 17.

Also, a distance between the first lens group $G_1$ and the second lens group $G_2$ (variable distance 5), a distance between the second lens group $G_2$ and the third lens group $G_3$ (variable distance 11), a distance between the third lens group $G_3$ and the fourth lens group $G_4$ (variable distance 13), and a distance between the fourth lens group $G_4$ and the fifth lens group $G_5$ (variable distance 20) at the focal length 1.0 (wide angle end) and the focal length 1.3 (telephoto end) are given on the lower part of Table 17.

Also, the fifth surface, and the fourteenth surface and the fifteenth surface were formed of the aspheric surfaces, respectively. In Table 18, values of the respective constants K, $A_3, A_4, A_5, A_6, A_7, A_8, A_9, A_{10}$ as to these aspheric surfaces in the above aspheric formula are given.

TABLE 17

| Surface number | R | D | Nd | vd |
|---|---|---|---|---|
| 1 | 2.0046 | 0.0603 | 1.64516 | 59.2 |
| 2 | 0.9475 | 0.3544 | | |
| 3 | −9.7462 | 0.0464 | 1.48749 | 70.2 |
| 4 | 1.8057 | 0.0093 | 1.52771 | 41.8 |
| 5* | 1.6011 | 0.6672(variable) | | |
| 6 | 2.9630 | 0.1650 | 1.84666 | 23.8 |
| 7 | −9.8585 | 0.0070 | | |
| 8 | 2.9048 | 0.2983 | 1.83500 | 34.7 |
| 9 | −1.3968 | 0.0468 | 1.81209 | 24.4 |
| 10 | −186.6141 | 0.3013 | | |
| 11 | ∞ | 0.4047(variable) (mask) | | |
| 12 | 1.1767 | 0.1657 | 1.48749 | 70.2 |
| 13 | −2.1275 | 0.0139(variable) | | |
| 14* | 4.3818 | 0.0695 | 1.68893 | 31.1 |

TABLE 17-continued

| | | | | |
|---|---|---|---|---|
| 15* | 0.7923 | 0.2773 | | |
| 16 | −0.5498 | 0.0371 | 1.84666 | 23.8 |
| 17 | 8.2152 | 0.3026 | 1.49700 | 81.5 |
| 18 | −0.7403 | 0.0070 | | |
| 19 | −36.1145 | 0.3192 | 1.71941 | 55.5 |
| 20 | −1.1714 | 0.0139(variable) | | |
| 21 | 3.5297 | 0.2158 | 1.84666 | 23.8 |
| 22 | −5.4786 | 0.4635 | | |
| 23 | ∞ | 1.2977 | 1.51633 | 64.1 |
| 24 | ∞ | | | |

Variable separation

| Focal distance | 1.0(wide end) | 1.3(telephoto end) |
|---|---|---|
| $D_5$ | 0.6672 | 0.2764 |
| $D_{11}$ | 0.4047 | 0.3658 |
| $D_{13}$ | 0.0139 | 0.1742 |
| $D_{20}$ | 0.0139 | 0.2832 |

*Aspheric surface

TABLE 18

Aspheric surface coefficient

| surface | K | $A_3$ | $A_4$ | $A_5$ | $A_6$ | $A_7$ |
|---|---|---|---|---|---|---|
| 5 | 0.0615 | 0.0000 | $-2.1478 \times 10^{-2}$ | 0.0000 | $-1.8919 \times 10^{-2}$ | 0.0000 |
| 14 | 0.5627 | 0.0000 | $-1.5006 \times 10^{-1}$ | 0.0000 | $5.4236 \times 10^{-3}$ | 0.0000 |
| 15 | 1.2194 | 0.0000 | $-7.4514 \times 10^{-2}$ | 0.0000 | $6.3545 \times 10^{-3}$ | 0.0000 |

| surface | $A_8$ | $A_9$ | $A_{10}$ |
|---|---|---|---|
| 5 | $-9.49770 \times 10^{-4}$ | 0.0000 | $-6.8661 \times 10^{-5}$ |
| 14 | $1.33550 \times 10^{-2}$ | 0.0000 | $-4.5811 \times 10^{-3}$ |
| 15 | $-9.96400 \times 10^{-6}$ | 0.0000 | $-1.2079 \times 10^{-3}$ |

Also, numerical values corresponding to above Conditional Expressions in Example 9 are given in Table 21.

FIG. 19 is aberration charts showing various aberrations (spherical aberration, astigmatism, distortion, and lateral chromatic aberration) of the projecting zoom lens according to Example 9.

As apparent from FIG. 19, according to the projecting zoom lens in Example 9, the angle of view 2ω was wide, that is, 60.0 degrees at the wide angle end and respective aberrations were corrected satisfactorily. In particular, since the eighth lens $L_8$ was formed of the aspheric lens, the field curvature of the S image surface could be very satisfactorily corrected. Also, because the eighth lens $L_8$ could satisfy Conditional Expression (5), this lens was constructed while taking a temperature change into consideration.

Also, since a value of a coefficient of linear expansion of the eighth lens $L_8$ was set to $101 \times 10^{-7}$, this eighth lens $L_8$ was hardly influenced by a temperature change. Thus, this lens could be arranged in a position on which a luminous flux is limited.

Also, as shown in Table 21, according to the projecting zoom lens in Example 9, Conditional Expressions (1) to (5), (6A), (6B), (6C), (7), (9), (10) are satisfied.

Example 10

Figure 10:
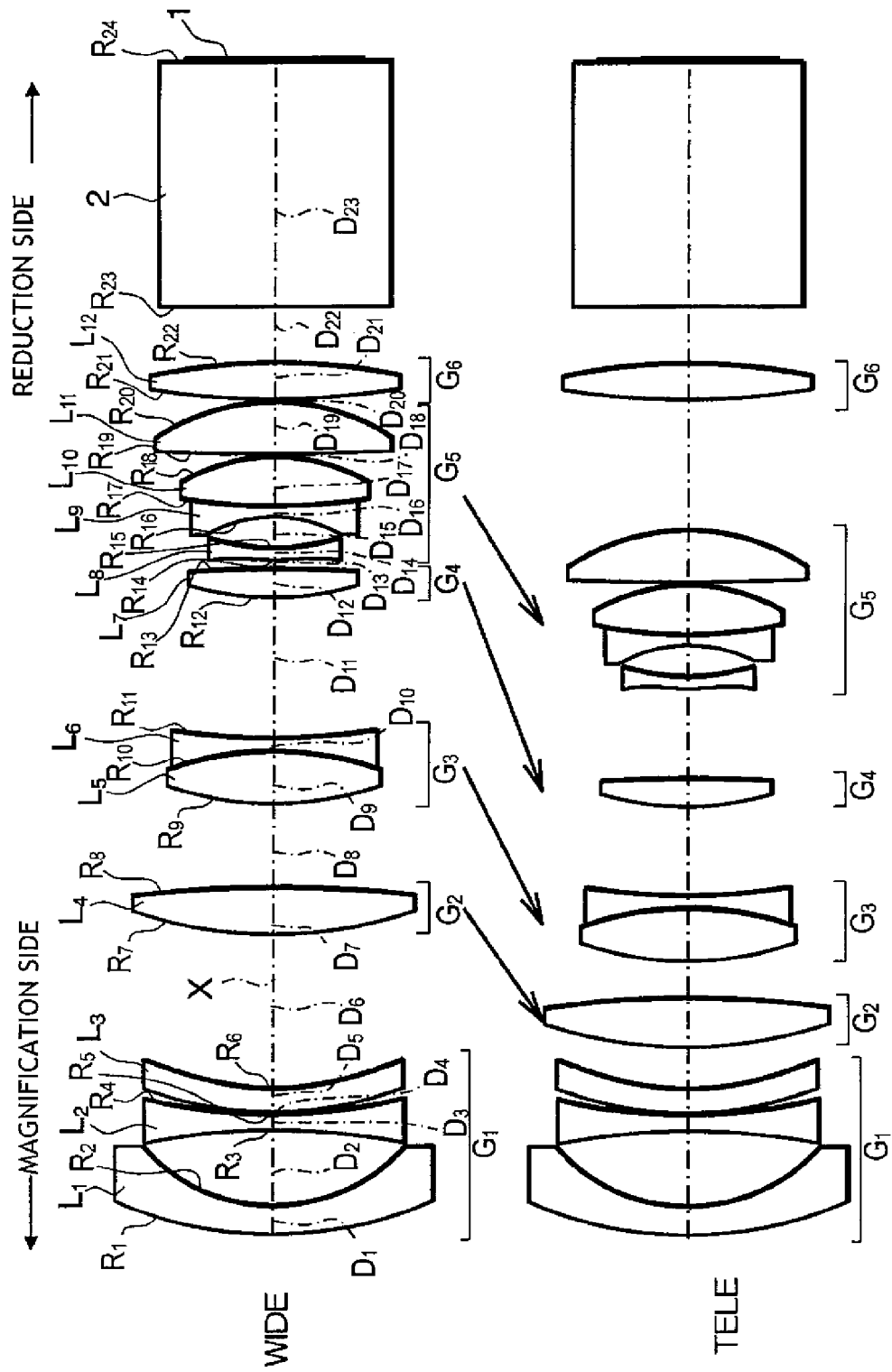
FIG. 10 is a lens configurative view of a projecting zoom lens according to Example 10 of the invention at a wide angle end and a telephoto end.

A schematic configuration of a projecting zoom lens according to Example 10 is shown in FIG. 10. The projecting zoom lens according to Example 10 had a six-group configuration and was constructed substantially similarly to that in Example 3. In explanation of corresponding drawings, the like reference symbols are affixed to the like elements and thus redundant explanations will be omitted herein.

In this Example, an "aspheric lens whose effective aperture is smallest" was an eighth lens $L_8$, and a pupil position was near the magnification side of a surface of a seventh lens $L_7$ on the magnification side.

Although not shown in FIG. 10, a mask may be provided and also a diaphragm may be used as the mask.

In this Example 10, radii of curvature R of the respective lens surfaces, center thicknesses of the respective lenses, air distances D between the respective lens, refractive indexes Nd of the respective lenses with respect to the d-line and Abbe numbers vd of the respective lenses are given on the upper part of Table 19.

Also, a distance between the first lens group $G_1$ and the second lens group $G_2$ (variable distance 6), a distance between the second lens group $G_2$ and the third lens group $G_3$ (variable distance 8), a distance between the third lens group $G_3$ and the fourth lens group $G_4$ (variable distance 11), a distance between the fourth lens group $G_4$ and the fifth lens group $G_5$ (variable distance 13), and a distance between the fifth lens group $G_5$ and the sixth lens group $G_6$ (variable distance 20) at the focal length 1.0 (wide angle end) and the focal length 1.6 (telephoto end) are given on the lower part of Table 19.

Also, the fifth surface and the sixth surface, and the fourteenth surface, the fifteenth surface were formed of the aspheric surfaces, respectively. In Table 20, values of the respective constants K, $A_3$, $A_4$, $A_5$, $A_6$, $A_7$, $A_8$, $A_9$, $A_{10}$, $A_{11}$, $A_{12}$, $A_{13}$, $A_{14}$ as to these asperice surfaces in the above aspheric formula are given.

TABLE 19

| Surface number | R | D | Nd | vd |
|---|---|---|---|---|
| 1 | 2.4957 | 0.1820 | 1.71300 | 53.9 |
| 2 | 1.0952 | 0.4774 | | |
| 3 | −3.8819 | 0.0936 | 1.51633 | 64.1 |
| 4 | 3.1649 | 0.0104 | | |
| 5* | 2.2711 | 0.1559 | 1.51007 | 56.2 |
| 6* | 1.5854 | 0.9492(variable) | | |
| 7 | 2.8617 | 0.2953 | 1.83400 | 37.2 |
| 8 | −6.8726 | 0.5191(variable) | | |
| 9 | 2.0155 | 0.3349 | 1.80100 | 35.0 |

TABLE 19-continued

| | | | | |
|---|---|---|---|---|
| 10 | −1.9491 | 0.0780 | 1.84666 | 23.8 |
| 11 | 4.4562 | 0.8837(variable) | | |
| 12 | 1.8522 | 0.1743 | 1.63980 | 34.5 |
| 13 | −12.2936 | 0.0517(variable) | | |
| 14* | 5.5962 | 0.0780 | 1.80518 | 25.4 |
| 15* | 1.0919 | 0.1984 | | |
| 16 | −0.8811 | 0.0624 | 1.74950 | 35.3 |
| 17 | 2.9919 | 0.3141 | 1.49700 | 81.5 |
| 18 | −1.2026 | 0.0104 | | |
| 19 | 32.0898 | 0.3297 | 1.72916 | 54.7 |
| 20 | −1.3474 | 0.0259(variable) | | |
| 21 | 5.4022 | 0.2266 | 1.71300 | 53.9 |
| 22 | −3.6661 | 0.3451 | | |
| 23 | ∞ | 1.5462 | 1.51633 | 64.1 |
| 24 | ∞ | | | |

| Variable separation | | |
|---|---|---|
| Focal distance | 1.0(wide end) | 1.6(telephoto end) |
| $D_6$ | 0.9492 | 0.2578 |
| $D_8$ | 0.5191 | 0.2335 |
| $D_{11}$ | 0.8837 | 0.5605 |
| $D_{13}$ | 0.0517 | 0.5602 |
| $D_{20}$ | 0.0259 | 0.8177 |

*Aspheric surface

TABLE 20

Aspheric surface coefficient

| surface | K | $A_3$ | $A_4$ | $A_5$ | $A_6$ | $A_7$ |
|---|---|---|---|---|---|---|
| 5 | 0.9961 | 0.0000 | −2.3694 × 10⁻² | 0.0000 | 5.9007 × 10⁻² | 0.0000 |
| 6 | 0.4199 | 0.0000 | −8.8695 × 10⁻² | 0.0000 | 8.5342 × 10⁻² | 0.0000 |
| 14 | 1.0000 | 0.0000 | −7.5105 × 10⁻¹ | 0.0000 | 1.5202 | 0.0000 |
| 15 | 1.0000 | 0.0000 | −6.2422 × 10⁻¹ | 0.0000 | 1.4641 | 0.0000 |

| surface | $A_8$ | $A_9$ | $A_{10}$ | $A_{11}$ | $A_{12}$ | $A_{13}$ | $A_{14}$ |
|---|---|---|---|---|---|---|---|
| 5 | −5.2780 × 10⁻² | 0.0000 | −5.7817 × 10⁻² | 0.0000 | 6.2859 × 10⁻² | 0.0000 | 7.4960 × 10⁻⁵ |
| 6 | −1.0288 × 10⁻¹ | 0.0000 | −5.2627 × 10⁻² | 0.0000 | 1.3814 × 10⁻¹ | 0.0000 | −5.7287 × 10⁻² |
| 14 | −4.5495 | 0.0000 | 7.7522 | 0.0000 | 0.0000 | 0.0000 | 0.0000 |
| 15 | −3.6696 | 0.0000 | 4.4768 | 0.0000 | 0.0000 | 0.0000 | 0.0000 |

Also, numerical values corresponding to above Conditional Expressions in Example 10 are given in Table 21.

Figure 20:
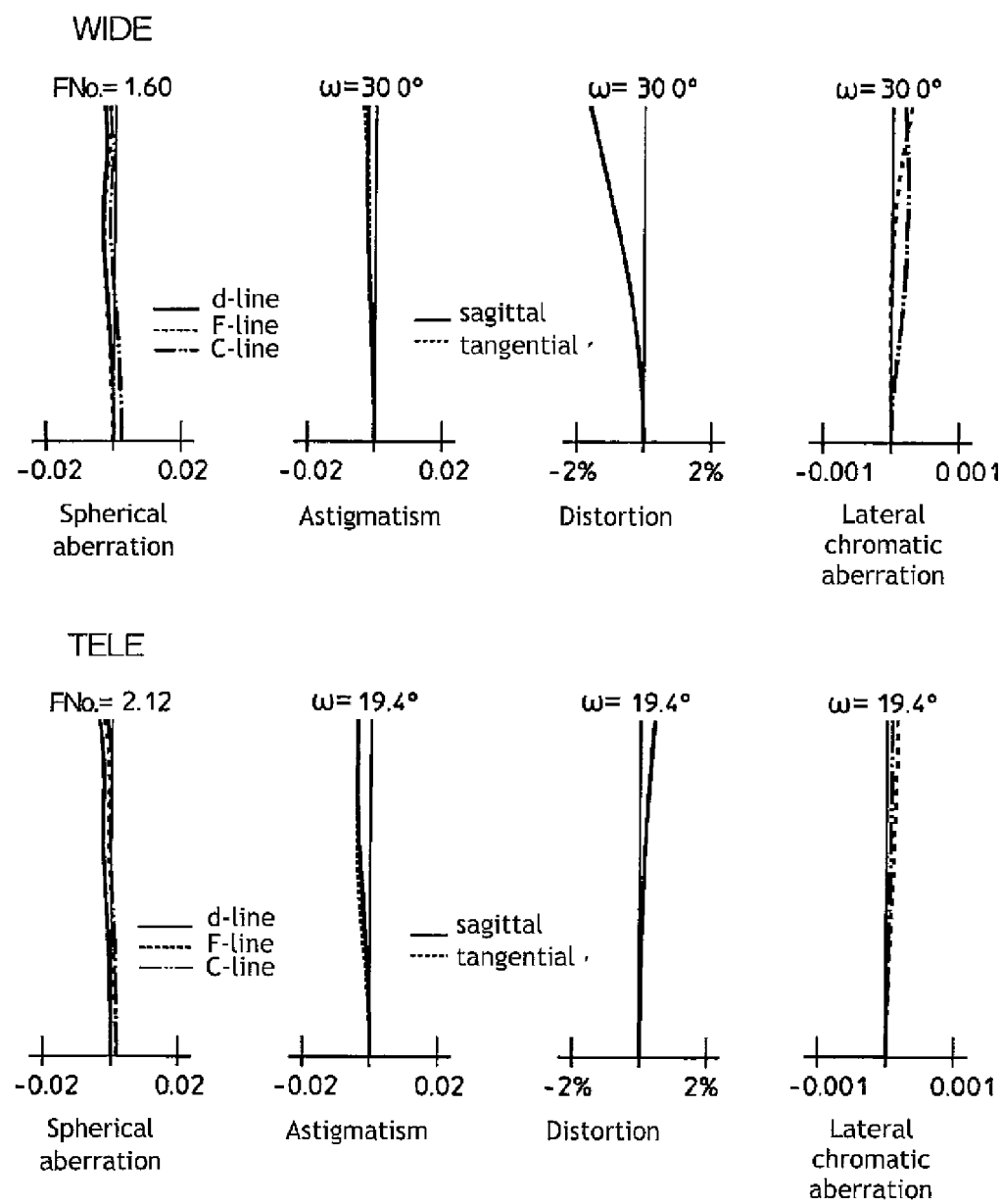
FIG. 20 is aberration charts of the projecting zoom lens according to Example 10.

FIG. 20 is aberration charts showing various aberrations (spherical aberration, astigmatism, distortion, and lateral chromatic aberration) of the projecting zoom lens according to Example 10.

As apparent from FIG. 20, according to the projecting zoom lens in Example 10, the angle of view 2ω was wide, that is, 60.0 degrees at the wide angle end and the respective aberrations were corrected satisfactorily. In particular, since the eighth lens $L_8$ was formed of the aspheric lens, the field curvature of the S image surface could be very satisfactorily corrected. Also, since a value of the coefficient of linear expansion of the eighth lens $L_8$ was set to 107×10⁻⁷, this eighth lens $L_8$ was hardly influenced by a temperature change. Thus, this lens could be arranged in a position on which a luminous flux is limited. Also, in Example 10, a zoom ratio was set to a high magnification of 1.6.

Also, as shown in Table 21, according to the projecting zoom lens in Example 10, Conditional Expressions (1) to (5), (6C), (7) to (10) are satisfied.

TABLE 21

| | Conditional expression | | | | | | | | | |
|---|---|---|---|---|---|---|---|---|---|---|
| | (1) | (2) | (3) | (4) | (5) ×10⁻⁷ | (6A)~(6C) | (7) | (8) | (9) | (10) |
| Example 1 | 1.47 | 2.67 | 0.76 | 0.51 | 101 | 3.73 | 59.6 | 1.2 | −1.11 | 31.1 |
| Example 2 | 1.38 | 2.92 | 0.57 | 0.92 | 101 | 6.58 | 75.0 | 2.1 | −1.37 | 31.1 |
| Example 3 | 1.40 | 1.95 | 0.79 | 0.38 | 101 | 6.18 | 59.8 | 1.6 | −1.09 | 31.1 |
| Example 4 | 1.47 | 3.07 | 0.71 | 0.82 | 101 | 6.31 | 68.6 | 1.6 | −1.24 | 31.1 |
| Example 5 | 1.30 | 2.07 | 0.75 | 0.70 | 101 | 4.80 | 58.6 | 1.6 | −1.98 | 31.1 |
| Example 6 | 1.32 | 1.36 | 0.62 | 0.36 | 70 | 3.44 | 60.6 | 1.3 | −0.63 | 44.5 |
| Example 7 | 1.32 | 1.36 | 0.58 | 0.34 | 101 | 3.32 | 60.4 | 1.3 | −0.62 | 31.1 |
| Example 8 | 1.32 | 1.47 | 0.60 | 0.40 | 101 | 3.33 | 60.2 | 1.2 | −0.66 | 31.1 |
| Example 9 | 1.32 | 1.42 | 0.63 | 0.35 | 101 | 3.78 | 60.0 | 1.3 | −0.66 | 31.1 |
| Example 10 | 1.36 | 1.68 | 0.73 | 0.68 | 107 | 5.45 | 60.0 | 1.6 | −1.02 | 25.4 |

What is claimed is:

1. A projecting zoom lens comprising:
a plurality of lens group, wherein:
at least two lens groups out of the plurality of lens groups are moved to perform a power varying operation,
a reduction side of the zoom lens is constructed as a substantially telecentric system,
at least one lens out of lenses of the plurality of lens groups is formed of an aspheric lens having at least one aspheric surface, and
the following Conditional Expressions (1) to (5) are satisfied:

$$1.2 \leq bf/fw \tag{1}$$

$$|fa/fw| \leq 4.5 \tag{2}$$

$$\phi a/\phi im \leq 1.0 \tag{3}$$

$$|ffaw/fw| \leq 1.5 \tag{4}$$

$$E \leq 300 \times 10^{-7} (/°C.) \tag{5}$$

where bf denotes an overall system back focus on the reduction side in air,
fw denotes an overall system focal length at a wide angle end,
fa denotes a focal length of the aspheric lens whose effective aperture is smallest,
φa denotes a maximum effective aperture of the aspheric lens whose effective aperture is smallest,
φim denotes a maximum diameter of an image circle in a conjugate position on the reduction side,
ffaw denotes a distance, on an optical axis, between (i) a surface on a magnification side of a surface of the aspheric lens whose effective aperture is smallest and (ii) a focal position, on the magnification side, of a complex lens that consists of the aspheric lens whose effective aperture is smallest and all lenses located on the reduction side of the aspheric lens whose effective aperture is smallest, at the wide angle end, and
E denotes a coefficient of a linear expansion of the aspheric lens whose effective aperture is smallest.

2. The projecting zoom lens according to claim 1, wherein the aspheric lens whose effective aperture is smallest is a lens having a negative refractive power.

3. The projecting zoom lens according to claim 1, wherein the following Conditional Expression (6A) is satisfied:

$$2.0 < L/fw < 5.0 \tag{6A}$$

where L denotes a total lens length of the overall system at the wide angle end.

4. The projecting zoom lens according to claim 2, wherein the following Conditional Expression (6A) is satisfied:

$$2.0 < L/fw < 5.0 \tag{6A}$$

where L denotes a total lens length of the overall system at the wide angle end.

5. The projecting zoom lens according to claim 3, wherein the following Conditional Expressions (6B) and (7) are satisfied:

$$2.0 < L/fw < 4.0 \tag{6B}$$

$$55 \leq 2\omega \text{ (degree)} \tag{7}$$

where 2ω denotes an angle of view at the wide angle end.

6. The projecting zoom lens according to claim 4, wherein the following Conditional Expressions (6B) and (7) are satisfied:

$$2.0 < L/fw < 4.0 \tag{6B}$$

$$55 \leq 2\omega \text{ (degree)} \tag{7}$$

where 2ω denotes an angle of view at the wide angle end.

7. The projecting zoom lens according to claim 1, wherein the following Conditional Expressions (6C) and (8) are satisfied:

$$3.0 < L/fw < 7.5 \tag{6C}$$

$$1.5 \leq ft/fw \tag{8}$$

where L denotes a total lens length of the overall system at the wide angle end, and
ft denotes an overall system focal length at a telephoto end.

8. The projecting zoom lens according to claim 2, wherein the following Conditional Expressions (6C) and (8) are satisfied:

$$3.0 < L/fw < 7.5 \tag{6C}$$

$$1.5 \leq ft/fw \tag{8}$$

where L denotes a total lens length of the overall system at the wide angle end, and
ft denotes an overall system focal length at a telephoto end.

9. The projecting zoom lens according to claim 1, wherein:
at least one of (i) an air lens formed by a surface, on the reduction side, of the aspheric lens whose effective aperture is smallest and a surface adjacent to the surface on the reduction side, and (ii) an air lens formed by a surface, on the magnification side, of the aspheric lens whose effective aperture is smallest and a surface adjacent to the surface on the magnification side, constitutes a negative air lens, and
the negative air lens satisfies the following Conditional Expression (9):

$$-2.0 < fn/fw \tag{9}$$

where fn denotes a focal length of the negative air lens.

10. The projecting zoom lens according to claim 1, wherein the aspheric lens whose effective aperture is smallest satisfies the following Conditional Expression (10):

$$vda \leq 50 \tag{10}$$

where vda denotes an Abbe number of the aspheric lens whose effective aperture is smallest.

11. The projecting zoom lens according to claim 1, wherein:
in the plurality of lens groups, an Fn lens group that has a fixed negative refractive power during power variation is arranged on the outermost magnification side and an Fp lens group that has a fixed positive refractive power during the power variation is arranged on the outermost reduction side, and
three or more lens groups that are moved during the power variation are arranged between the Fn lens group and the Fp lens group.

12. A projection display device comprising:
a light source;
one or plural light valves illuminated with a luminous flux from the light source;
an illumination optical system that guides illumination light from the light source to the respective light valves; and
the projecting zoom lens according to claim 1, the projecting zoom lens that projects the illumination light modulated by the light valves, onto a screen.

* * * * *